US006188721B1

(12) United States Patent
Shirani et al.

(10) Patent No.: US 6,188,721 B1
(45) Date of Patent: Feb. 13, 2001

(54) SYSTEM AND METHOD FOR ADAPTIVE EQUALIZATION OF A WAVEFORM INDEPENDENT OF ABSOLUTE WAVEFORM PEAK VALUE

(75) Inventors: Ramin Shirani, Morgan Hill; Saied Benyamin; Michael A. Brown, both of San Jose, all of CA (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/061,937

(22) Filed: Apr. 17, 1998

(51) Int. Cl.[7] .............................. H03H 7/30; H03H 7/40; H03K 5/159
(52) U.S. Cl. ............................ 375/232; 708/323
(58) Field of Search .................... 375/232, 231, 375/230, 350; 708/322, 323; 333/17.1, 18, 28 R

(56) References Cited

U.S. PATENT DOCUMENTS

| 3,414,819 | 12/1968 | Lucky . |
| 3,571,733 | 3/1971 | Fang . |
| 3,746,989 | 7/1973 | Heim . |
| 4,052,671 | 10/1977 | Lange . |
| 4,187,479 | 2/1980 | Ishizuka et al. . |
| 4,243,956 | 1/1981 | Lemoussu et al. . |
| 4,275,358 | 6/1981 | Winget . |
| 4,378,535 | 3/1983 | Chiu et al. . |
| 4,459,698 | 7/1984 | Yumoto et al. . |
| 4,507,793 | 3/1985 | Adams . |
| 4,538,283 | 8/1985 | Hogge, Jr. . |
| 4,583,235 | 4/1986 | Domer et al. . |
| 4,592,068 | 5/1986 | Jessop et al. . |
| 4,689,805 | 8/1987 | Pyhalammi et al. . |
| 4,768,205 | 8/1988 | Nakayama . |
| 4,849,989 | * 7/1989 | Kamerman ........................ 375/231 |
| 4,873,700 | 10/1989 | Wong . |
| 4,961,057 | 10/1990 | Ibukuro . |
| 5,036,525 | 7/1991 | Wong . |
| 5,105,440 | 4/1992 | Huellwegen . |
| 5,115,213 | 5/1992 | Eguchi . |
| 5,293,405 | 3/1994 | Gersbach et al. . |
| 5,305,350 | 4/1994 | Budin et al. . |
| 5,337,025 | 8/1994 | Polhemus . |
| 5,448,589 | 9/1995 | McKibben . |
| 5,490,169 | 2/1996 | Blackwell et al. . |
| 5,559,460 | 9/1996 | Cunningham . |
| 5,949,819 | * 9/1999 | Bjarnason et al. .................... 375/222 |

OTHER PUBLICATIONS

Author unknown, "Chapter 9, Computer Networks," all pages of chapter, last modified Jun. 26, 1996, http://uranus.ee.auth.gr/report/eng/part2/chapt–09/9–0.html.

* cited by examiner

Primary Examiner—Stephen Chin
Assistant Examiner—Betsy L. Deppe
(74) Attorney, Agent, or Firm—Patrick T. King

(57) ABSTRACT

An improved adaptive equalizer providing the proper amount of equalization to restore the missing frequency components of a received and underequalized waveform. The invention'equalization gain or pulse counting feature can be set at various levels by digitally programming the control logic of the invention. Additionally, the digital control features of the invention permit higher accuracy in determining required equalizations for waveforms and avoid variations, such as temperature process variations, present in analog systems. The invention permits higher accuracy in determining required equalizations for waveforms. The invention finds, holds, and updates the average low frequency peak of the incoming signal in a highly digital manner. Since peak information is digitally held, it is not subject to the data dependent drifts inherent in analog peak detectors. The invention equalizes the signal by continually digitally comparing the high frequency peaks of the incoming transitions to the average low frequency peak and either adding or subtracting frequency components until the high and average low frequency peaks are close to one another. The amount of frequency compensation is a measure of the equalization and is digitally held by the invention and continually updated.

10 Claims, 23 Drawing Sheets

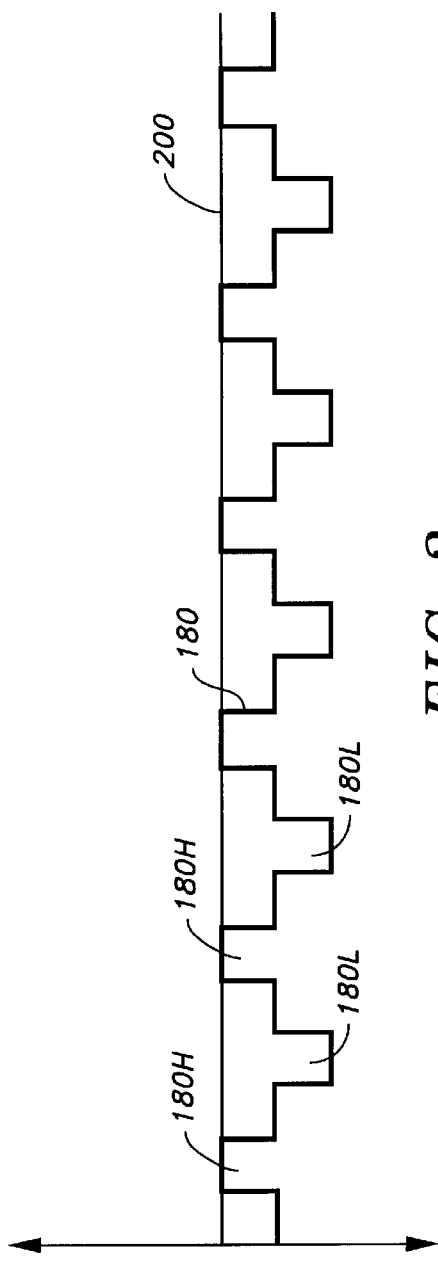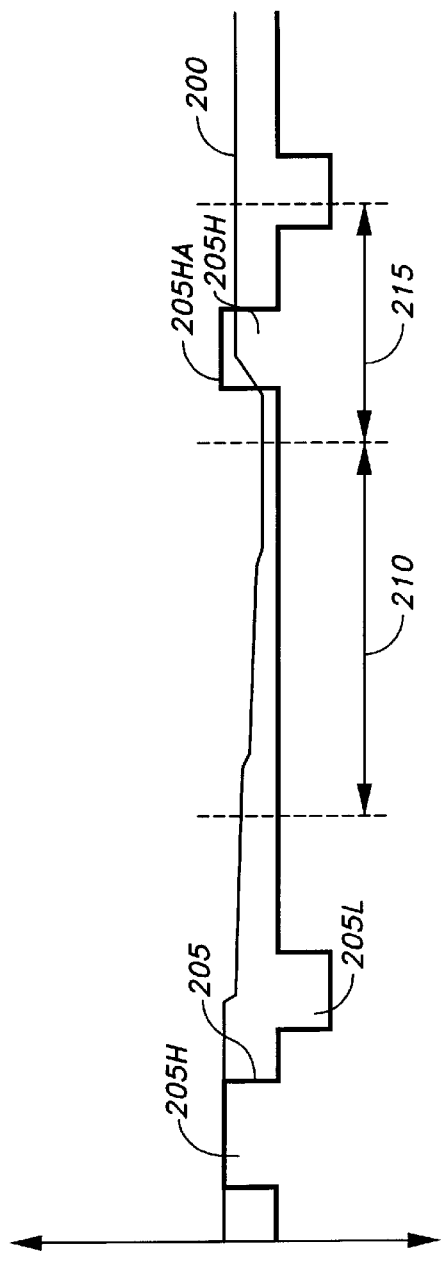

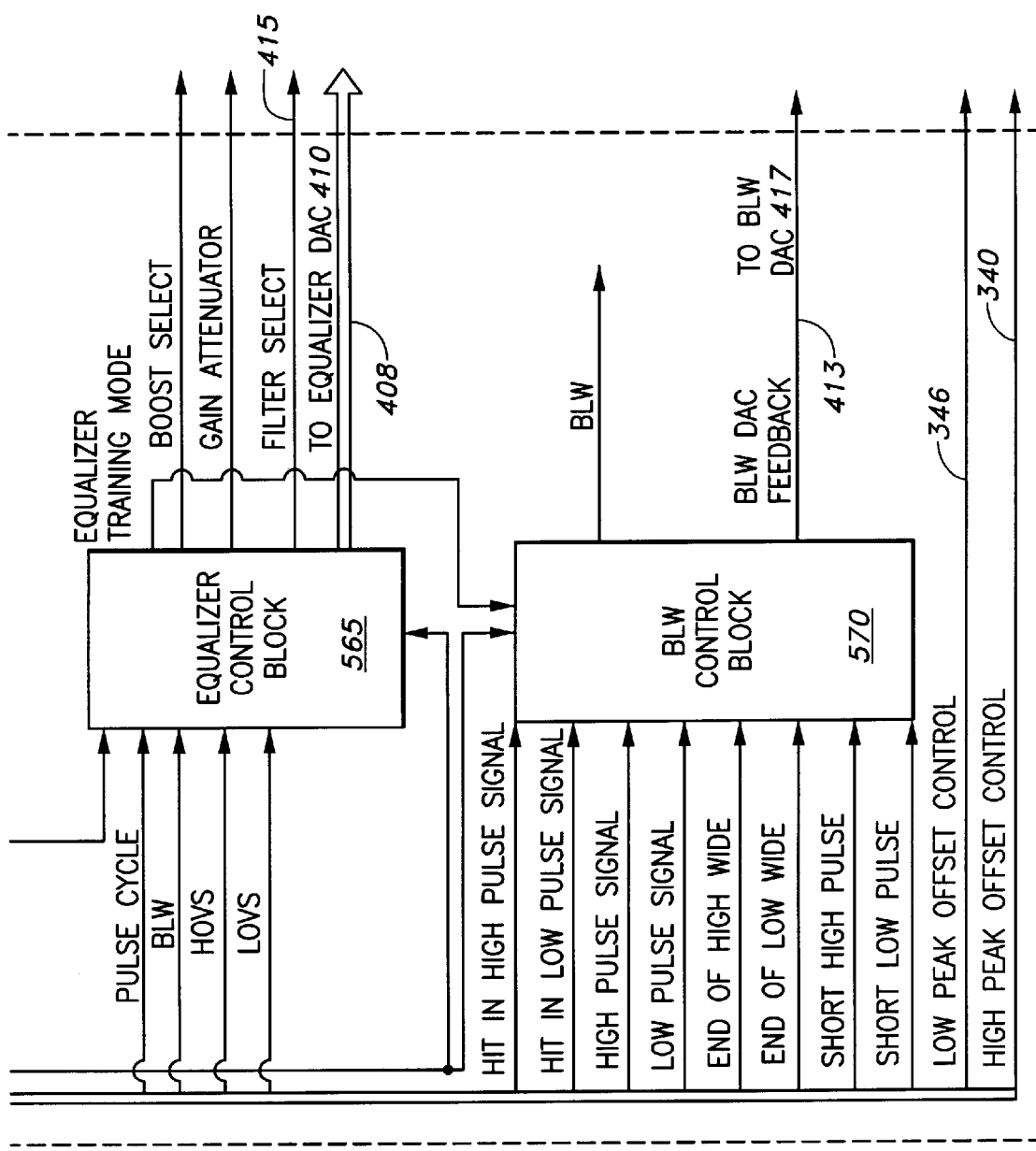

SYSTEM AND METHOD FOR ADAPTIVE EQUALIZATION OF A WAVEFORM INDEPENDENT OF ABSOLUTE WAVEFORM PEAK VALUE

CROSS-REFERENCES TO RELATED APPLICATIONS

This application incorporates by reference co-pending U.S. application Ser. No. 08/062,342, filed Apr. 17, 1998, entitled "System and Method for Compensating for Baseline Wander," by inventors Ramin Shirani et al., assigned to Enable Semiconductor, Inc., a California corporation.

BACKGROUND OF THE INVENTION

1. Field of the Invention

The present invention relates generally to adaptive equalizer systems and more specifically to a high-speed, digitally-controlled adaptive equalizer system for facilitating computer communications in a local area network.

2. Background Art

Equalization restores a data waveform' frequency components which are lost when the waveform propagates through data transmission channels such as cables. Thus, equalization permits the received waveform to closely resemble the originally transmitted waveform. A typical application of an equalization scheme in the data communications art is to facilitate digital computer communication among workstations in a local area network (LAN).

The magnitude of frequency loss in a received waveform depends upon the length of the data transmission channel. Longer transmission channels cause losses across all frequencies but with greater losses in high frequency signals. Thus, the farther apart two workstations are in a LAN, the more likely the received data will be: attenuated by frequency, shifted in phase (frequency dispersion), and attenuated with less signal-to-noise (S/N) due to crosstalk.

Adaptive equalizer systems determine and provide equalizations required for a received waveform to ultimately resemble the originally transmitted waveform. FIG. 1 shows a conventional adaptive equalizer system 100 in which workstation 102 transmits waveform 105 via transmission line 110 to workstation 115. Waveform 105 is typically the MLT3 three-level code signal. Transmission line 110 is typically unshielded twisted pair wiring. However, transmission line 110 may also include shielded twisted pairs, attachment unit interface (AUI) cables, copper distributed data interface (CDDI), coaxial transmission lines, or other types of wiring. Workstations 102 and 115 may also include other types of transmitters/receivers in a fast Ethernet (100 Mbps Ethernet) or 100Base-X communications network system. Additional details on CDDI (FDDI) are discussed in Fibre Distributed Data Interface (FDDI)—Part: Token Ring Twisted Pair Physical Layer Medium Dependent (TP-PMD), American National Standard for Information Systems (Mar. 1, 1995) and in U.S. Pat. No. 5,305,350 issued to Budin et al. on Apr. 19, 1994, both of which are fully incorporated herein by reference thereto as if repeated verbatim immediately hereinafter.

The receiving end of transmission line 110 is connected through a data jack 120, such as an RJ45 jack, to the primary winding of a decoupling transformer 125 which decouples the received waveform 105'. The secondary winding of decoupling transformer 125 is connected to a transceiver chip 130 which includes an equalizer (gain stage) 135, a peak detector and comparator 140 and slicers 145 and 150.

Conventional equalizer units are also shown and described in U.S. Pat. No. 5,115,213 issued to Eguchi on May 19, 1992; in U.S. Pat. No. 4,187,479 issued to Ishizuka on Feb. 5, 1980; in U.S. Pat. No. 4,689,805 issued to Pyhalammi et al. on Aug. 25, 1987; in U.S. Pat. No. 5,036,525 issued to Wong on Jul. 30, 1991; in U.S. Pat. No. 4,275,358 issued to Winget on Jun. 23, 1981; in U.S. Pat. No. 4,378,535 issued to Chiu et al. on Mar. 29, 1983; in U.S. Pat. No. 4,768,205 issued to Nakayama on Aug. 30, 1988; in U.S. Pat. No. 5,337,025 issued to Polhemus on Aug. 9, 1994; in U.S. Pat. No. 5,293,405 issued to Gersbach et al. on Mar. 8, 1994; in U.S. Pat. No. 4,459,698 issued to Yumoto et al. on Jul. 10, 1984; in U.S. Pat. No. 4,583,235 issued to Domer et al. on Apr. 15, 1986; in U.S. Pat. No. 4,243,956 issued to Lemoussu et al. on Jan. 6, 1981; in U.S. Pat. No. 4,961,057 issued to Ibukuro on Oct. 2, 1990; and in L. J. Giacoletto (editor), *Electronics Designers' Handbook* ($2^{nd}$ d.), McGraw-Hill Book Company, New York, N.Y. (1977). The references mentioned above are incorporated herein by reference. Peak detector circuits or methods used in adaptive equalizers are also disclosed in U.S. Pat. Nos. 5,293,405, 4,768,205, 4,592,068, 4,459,698, 4,873,700 and 5,036,525, which are incorporated by reference.

A peak reference source 155 generates a "PEAK-REFERENCE" signal having a specific amplitude equal to the pre-propagation amplitude of waveform 105 at some frequency. Peak detector 140 compares the absolute amplitude value of received waveform 105' (at a specific frequency) with the amplitude value of the PEAK-REFERENCE signal and generates an "ERROR" signal based on the difference in amplitudes of both signals. The ERROR signal propagates, via feedback loop 142 with gain stage 144, to equalizer 135, which equalizes received waveform 105' to resemble originally-transmitted waveform 105.

Slicer 145 outputs via line 160 an output signal "SLICER1," while slicer 150 outputs via line 165 an output signal "SLICER2." The SLICER1 and SLICER2 signals slice equalized waveform 105' at predetermined voltage levels and are also driven into OR gate 167 which outputs a non-return-to-zero-inverted (NRZI) signal. (FIG. 2 shows the slicing levels of the SLICER1 and SLICER2 signals in received waveform 105'.)

In a conventional adaptive equalizer system 100 with a peak detector 140, peak reference source 155 generates the appropriate ERROR signal based on the following reference ratio: the received waveform 105' will have an amplitude value of 2±5% volts for a transmission line 110 of zero-meter length.

However, conventional adaptive equalizer systems 100 are typically unable to fully comply with the above-mentioned 2±5% volt reference amplitude value.

Additionally, data jack 120 and decoupling transformer 125 often cause amplitude voltage loss in waveform 105, thereby also impacting the required 2±5% volt reference voltage relied upon by peak reference source 155. Additionally, transformer manufacturers have been unable to fully prevent the amplitude voltage loss caused by decoupling transformers 125, partly due to variations in manufacturing processes.

Another disadvantage in conventional adaptive equalizer systems 100 is the difficulty in designing and manufacturing reliable CMOS-based peak detectors 140. This difficulty is a result of the following factors in CMOS technology: (1) lower transconductance, (2) greater offset presented to the inputs in the differential pair, (3) the presence of CMOS drift, and (4) process variations among different manufacturers. Peak detectors 140 may be reliably designed based on bipolar technology, but these would require more integrated circuit chip surface area and consume more power.

A conventional adaptive equalizer 100 has a further disadvantage in that peak detector accuracy depends on the pattern of the transmitted waveform. For example, FIG. 3 shows a dense-data patterned waveform 180 being received from transmission line 110 (see FIG. 1). A high peak signal 200 (FIG. 4) internal to peak detector 140 can be used to accurately detect high (positive) data pulses 180H of received dense-data patterned waveform 180, thereby accurately measuring the waveform amplitude. For a received sparse-data patterned waveform 205 of FIG. 4, internal high peak signal 200 decrements in a window 210 lacking high pulses (data) 205H. When high pulses 205H again appear in a window 215, the peak detector logic circuitry cannot increment high peak signal 200 to the actual peak 205HP of a high pulse 205H. Thus, conventional peak detectors may inaccurately measure the absolute amplitude value of received sparse-data patterned waveform 205.

In addition, experiments have shown that "pseudo-random test patterns" (i.e., linear feedback shift register LFSR patterns of orders 11, 15 and 23) yield different equalization levels, since the conventional adaptive equalizer may be tuned for one pattern (e.g., LFSR order 11) which is not optimal for another pattern (e.g., LFSR order 15). An LSFR order determines a waveform'"run-length" characteristic. Thus, waveforms with higher LSFR orders will contain longer run-length characteristics.

What is needed is a system and method for adaptive equalization which would overcome these problems of conventional adaptive equalizer systems with peak detectors.

SUMMARY

The present invention improves computer communications between workstations connected in a local area network. Electrical signals traveling through communication wire become degraded by the interface connections at the workstations as well as by the wire itself. The process for restoring the frequency components to the electrical signal is known as equalization. When equalization is done so that the equalization parameters automatically vary to optimize the result according to changing conditions, this process is known as adaptive equalization.

The invention provides the proper amount of equalization to restore the missing frequency components of a received and underequalized waveform. The invention makes possible the advantages of providing an adaptive equalizer for equalizing high-speed data signals and of providing a digitally-controlled adaptive equalizer which can be widely tuned and adjusted for various applications. For example, the invention'equalization gain or pulse counting feature can be set at various levels by digitally programming the control logic of the invention. Additionally, the digital control features of the invention permit higher accuracy in determining required equalizations for waveforms and avoid variations, such as temperature process variations, present in analog systems.

The invention also does not use a conventional peak detector which relies on a PEAK-REFERENCE signal to determine the waveform equalization amount. Thus, the invention permits higher accuracy in determining the required equalizations for waveforms.

The invention finds, holds, and updates the average low frequency peak of the incoming signal in a highly digital manner. Since peak information is digitally held, it is not subject to the data dependent drifts inherent in analog peak detectors. The invention equalizes the signal by continuously digitally comparing the high frequency peaks of the incoming transitions to the average low frequency peak and either adding or subtracting frequency components until the high and average low frequency peaks are close to one another. The amount of frequency compensation is a measure of the equalization, and it is digitally held by the invention and continuously updated.

BRIEF DESCRIPTION OF THE DRAWINGS

FIG. 3 shows the flow of signals in the peak detector of FIG. 1 when the received waveform to be equalized has a dense data pattern;

FIG. 4 shows the flow of signals in the peak detector of FIG. 1 when the received waveform to be equalized has a sparse data pattern;

DETAILED DESCRIPTION OF THE INVENTION

Glossary of Terms baseline wander—a phenomenon that occurs when a waveform is passed through a decoupling transformer, also known as "DC droop," which results in a large drift of the waveform above or below the return voltage, measured in hundreds of millivolts;
bit time—one bit time equals eight (8) nanoseconds;
clock—each clock equals eight (8) nanoseconds;
common mode—a reference voltage level for a waveform that splits high pulses from low pulses and is ideally sits at a value above ground and defined as zero volts on an MLT-3 coded signal;
incoming leading-rising-edge pulse—a pulse of a waveform at a voltage greater than the common mode;
high pulse—a pulse of a waveform at a voltage greater than the common mode;
incoming leading-falling-edge pulse—a pulse of a waveform at a voltage less than the common mode;
low pulse—a pulse of a waveform at a voltage less than the common mode;
negative pulse—a pulse of a waveform at a voltage less than the common mode;
positive pulse—a pulse of a waveform at a voltage greater than the common mode;
wobble—a small drift of the waveform above or below the common mode measured in tens of millivolts;
region A—the region of a pulse between zero and eight nanoseconds typically containing most of the high frequency components of the pulse;
region B—the region of a pulse between eight and sixteen nanoseconds;
region C—the region of a pulse between sixteen and thirty-two nanoseconds typically containing most of the low frequency components of the pulse; and
waveform—a train of pulses.

Adaptive Equalizer System Overview

Figure 1:
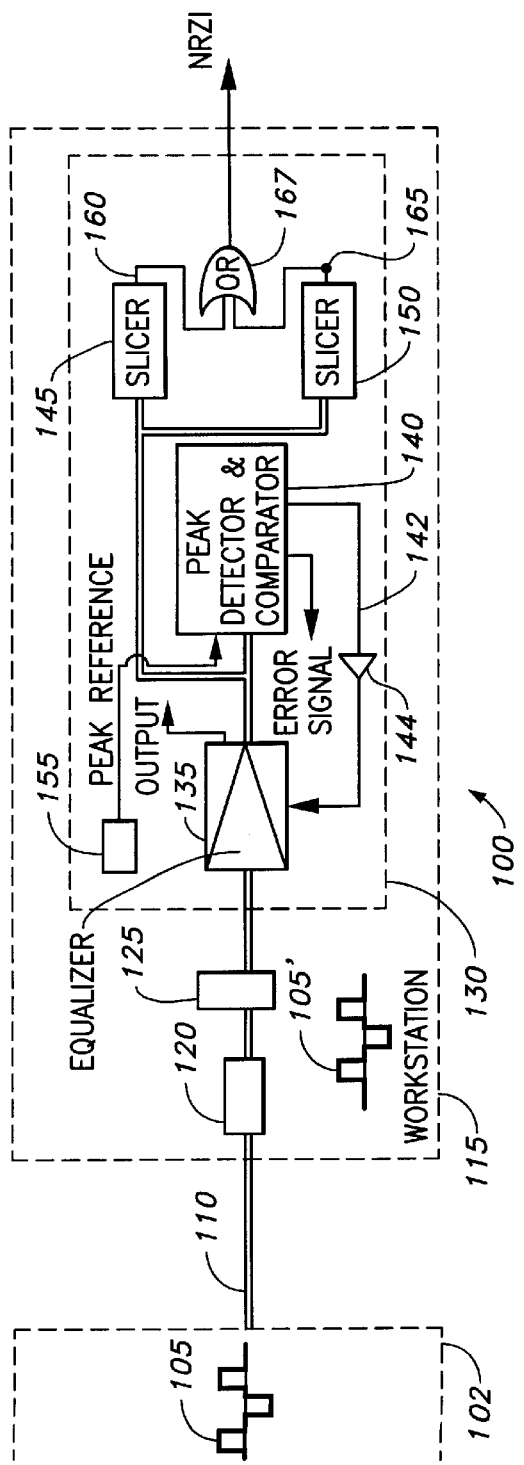
FIG. 1 is a block diagram of a conventional adaptive equalizer system with a peak detector.
Figure 5:
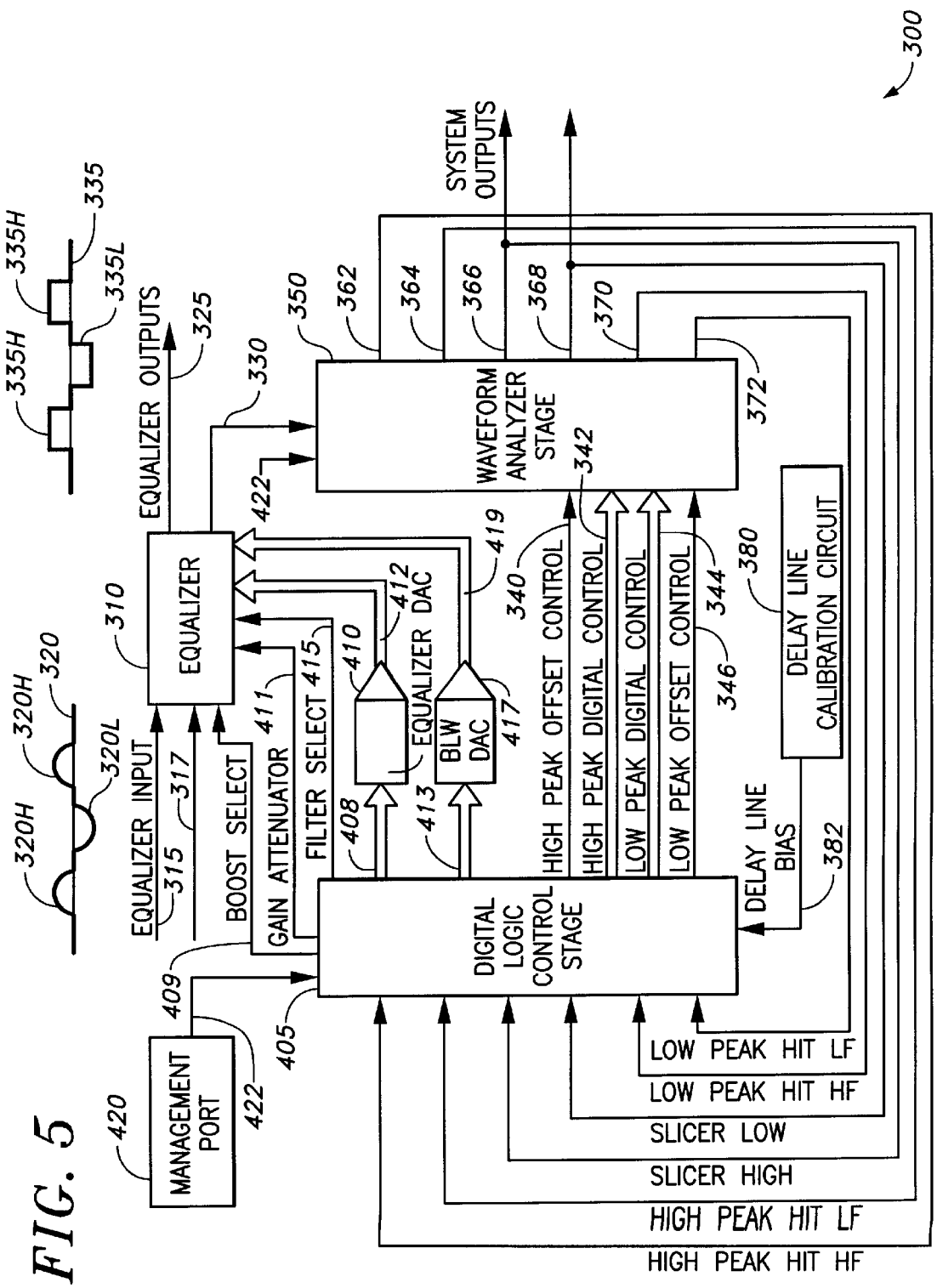
FIG. 5 is a block diagram of an adaptive equalizer system according to a preferred embodiment of the invention.

FIG. 5 shows an adaptive equalizer system 300 according to a preferred embodiment of the present invention. Adaptive equalizer system 300 is implemented in various components, such as the "ESI Line Interface Chip" which will be commercially available from Enable Semiconductor, Inc. of San Jose, Calif. Adaptive equalizer system 300 is an improvement over transceiver 130 shown in FIG. 1 (system 300 in FIG. 5 does not show outputs going to an OR gate).

Adaptive equalizer system 300 is comprised of three major components: "equalizer 310," "digital logic control stage 405," and "waveform analyzer stage 350." These three components form a closed loop for implementing adaptive equalization of computer data. Further, digital logic control stage 405 and waveform analyzer stage 350 forms a feedback loop for setting the peaks of the data.

Equalizer 310 has a differential pair of data input lines, line 315 and line 317, which are the data inputs to system 300. This pair receives an MLT-3, threelevel, input waveform 320. Waveform 320 has propagated through a data transmission channel and become attenuated by frequency, shifted in phase (frequency dispersion), and attenuated with less signal-to-noise (S/N) due to crosstalk. A differential pair has the same analog waveform on each line, but one line is a complement of the other line.

Equalizer 310 has a differential pair of data output lines, line 325 and line 330, which carries an output waveform 335. Output waveform 335 is produced by adaptive equalizer system 300. Waveform 335 is specified to approximate waveform 320 prior to 320'degradation by the data transmission channel. One line of the output differential pair, line 330, is connected to an input of a waveform analyzer stage 350. One line of a differential pair carries a single-ended signal. Therefore, line 330 carries a single-ended digital signal ranging from ±0.5V to −0.5V around a common mode. Line 325 is not used by system 300.

In addition to the two data input lines (discussed supra), equalizer 310 uses five signal input lines: input line 409, which carries boost select information; input line 411, which carries gain attenuator information; input line 415, which carries filter select information; input bus 412, which carries equalization information; and the input bus 419, which is used to compensate for baseline wander.

In short, equalization is performed on waveform 335 by equalizer 310 based on information from the loop consisting of waveform analyzer stage 350 and digital logic control stage 405. Feedback from equalizer 310 is sent to this loop on line 330. Summarizing, the information on the five input signal lines going into equalizer 310 come after system 300 processes waveform 335.

Digital logic control stage 405 has two output bus terminals and two output signal terminals connected to appropriate input terminals of waveform analyzer stage 350. The digital signals connecting stage 405 and stage 350 are, respectively, a "HIGH PEAK OFFSET CONTROL" signal on line 340, a "HIGH PEAK DIGITAL CONTROL" signal on bus 342, a "LOW PEAK DIGITAL CONTROL" signal on bus 344, and a "LOW PEAK OFFSET CONTROL" signal on line 346.

The HIGH PEAK DIGITAL CONTROL signal on bus 342 contains digital information which is sent to a digital-to-analog converting (DAC), HIGH PEAK DAC 450, in waveform analyzer stage 350. HIGH PEAK DIGITAL CONTROL provides 128 possible voltage settings for tracking the high pulses 335H in output waveform 335. The LOW PEAK DIGITAL CONTROL signal on bus 344 contains digital information which is sent to LOW PEAK DAC 470 in waveform analyzer stage 350. LOW PEAK DIGITAL CONTROL provides 128 possible voltage settings for tracking the low pulses 335L in output waveform 335.

Figure 18:
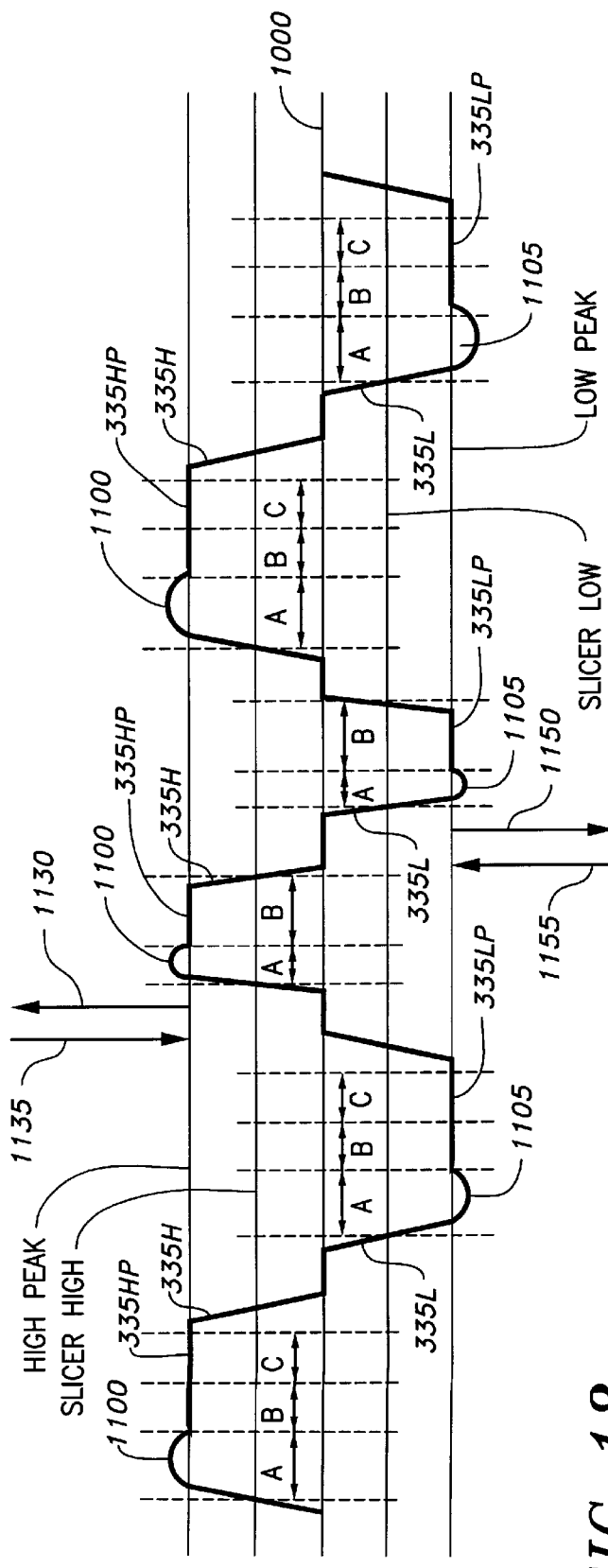
FIG. 18 is used to illustrate a method of adjusting the peaks of high pulses 335H and low pulses 335L, after peak training mode has completed training.

The HIGH PEAK OFFSET CONTROL signal on line 340 controls the application of a programmable voltage addition between 0 millivolts and 40 millivolts to the voltage setting determined by HIGH PEAK DIGITAL CONTROL when a high pulse 335H is in REGION A (see FIG. 18). The LOW PEAK OFFSET CONTROL signal on line 346 controls the application of a programmable voltage addition between 0 millivolts and 40 millivolts in the voltage setting determined by LOW PEAK DIGITAL CONTROL when a low pulse 335L is in REGION A (see FIG. 18). Digital logic control stage 405 is discussed below in conjunction with FIGS. 8, 9, 10, 11, 12, and 13.

Waveform analyzer stage 350 has six output terminals connected to six input terminals of digital logic control stage 405. The digital signals traveling on these lines are, respectively, a "HIGH PEAK HIT HIGH FREQUENCY" ("HIGH PEAK HIT HF") on line 362, a "HIGH PEAK HIT LOW FREQUENCY" ("HIGH PEAK HIT LF") on line 364, a "SLICER HIGH" on line 366, a "SLICER LOW" on line 368, a "LOW PEAK HIT HIGH FREQUENCY" ("LOW PEAK HIT HF") on line 370, and a "LOW PEAK HIT LOW FREQUENCY" ("LOW PEAK HIT LF") on line 372. SLICER HIGH on line 366 and SLICER LOW on line 368 are the data outputs of system 300 which are sent to the "clock recovery module" (not shown) of the ESI Line Interface Chip. These signals and waveform analyzer stage 350 are discussed below in conjunction with FIG. 6A.

Digital logic control stage sends five input signals over buses and lines to Equalizer 310. A signal is sent over eight (8) bit bus 408 to equalizer DAC 410. Equalizer DAC 410 drives an output signal on bus 412 to equalizer 310 for setting the strength of equalization. Digital logic control stage 405 sends a signal over sixty-four (64) bit bus 413 to a baseline wander (BLW) DAC 417. BLW DAC 417 drives a signal over bus 419 to equalizer 310 that compensates input waveform 320 for the DC offset caused by baseline wander.

Figure 2:
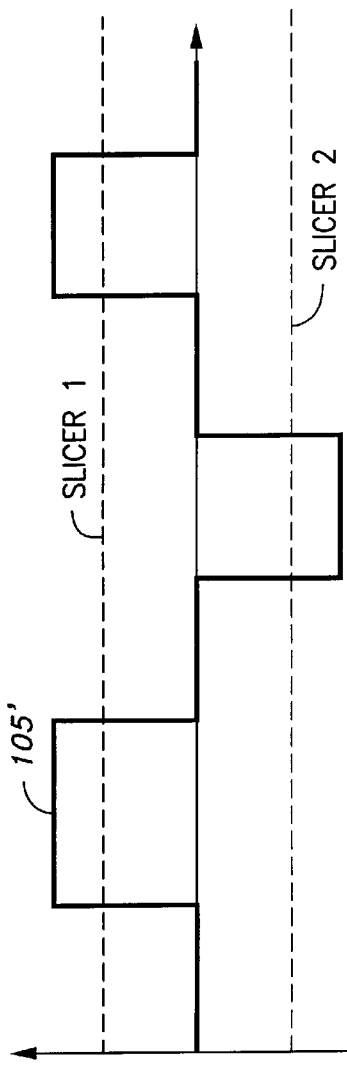
FIG. 2 shows the flow of signals from the conventional adaptive equalizer system of FIG. 1.

Digital logic control stage 405 is also connected via line 415 directly to equalizer 310 for providing a "FILTER SELECT" signal to choose between two different high frequency boost filters (not shown) in equalizer 310. The FILTER SELECT signal is chosen dependent on whether a long or short transmission line 110 (see FIG. 1) connects workstation 102 (see FIG. 1) and workstation 115 (see FIG. 2). Line 409 sends a "BOOST SELECT" signal that is gated on when the equalization algorithm determines that further equalization is required for longer transmission line 110 (see FIG. 1) Line 411 sends a "GAIN ATTENUATOR" signal that is gated on and off during the algorithm that also determines the final setting of FILTER SELECT.

Figure 9:
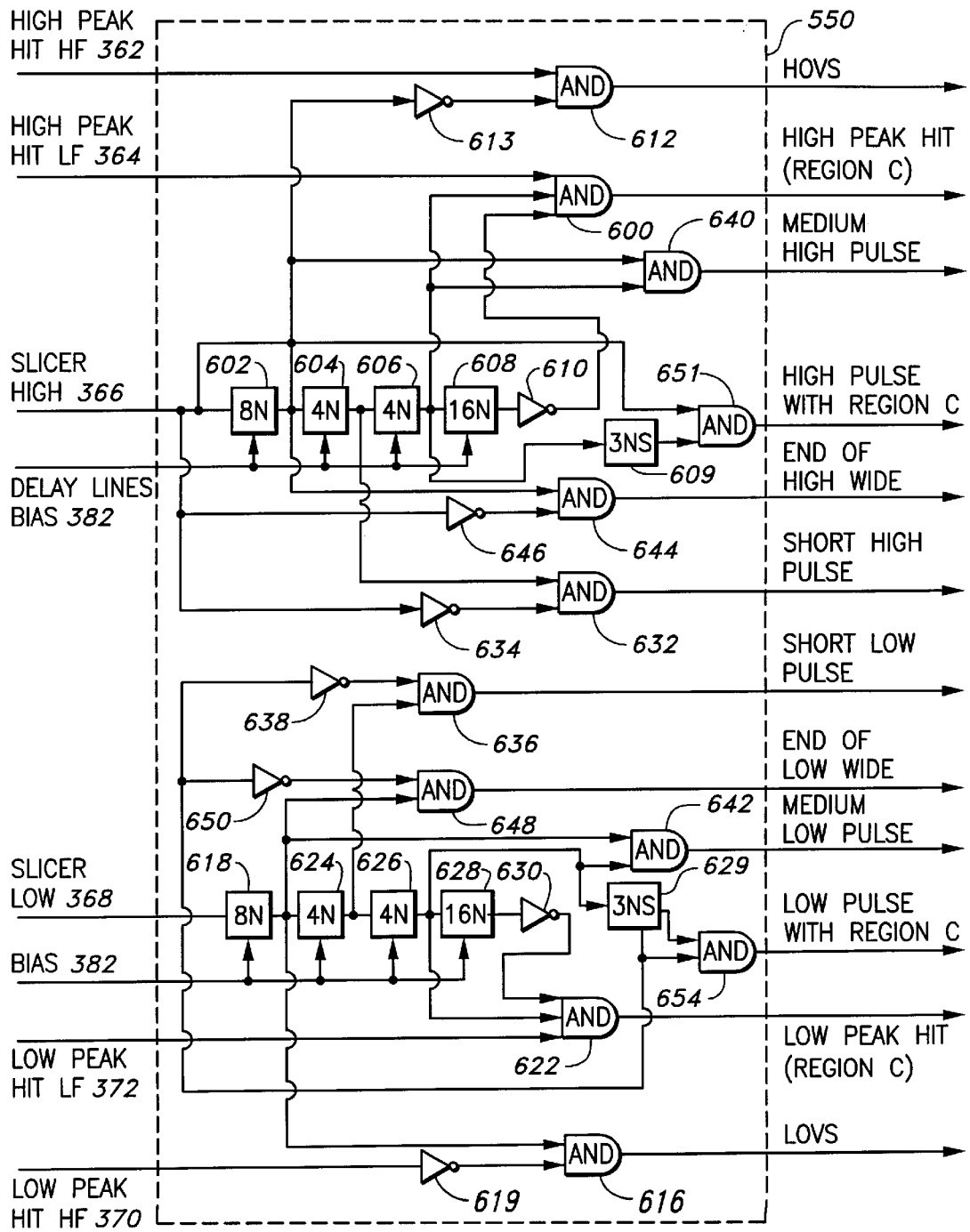
FIG. 9 shows elements of the synchronizer/region definer control block of FIG. 8.

Discussed below in conjunction with FIG. 7, a delay line calibration circuit 380 sends a "DELAY LINE BIAS" signal on line 382 to delay elements in digital logic control stage 405. The delay elements are located in the synchronizer/region definer 550 (see FIG. 9) and are calibrated using DELAY LINE BIAS (the delay elements in FIG. 9 are 602, 604, 606, 608, 609, 618, 624, 626, 628, and 629). Finally, a management port 420 sends over cable 422 various programmable values (indicated below) to digital logic control stage 405 and waveform analyzer stage 350.

Waveform Analyzer Stage Description

Figure 6A:
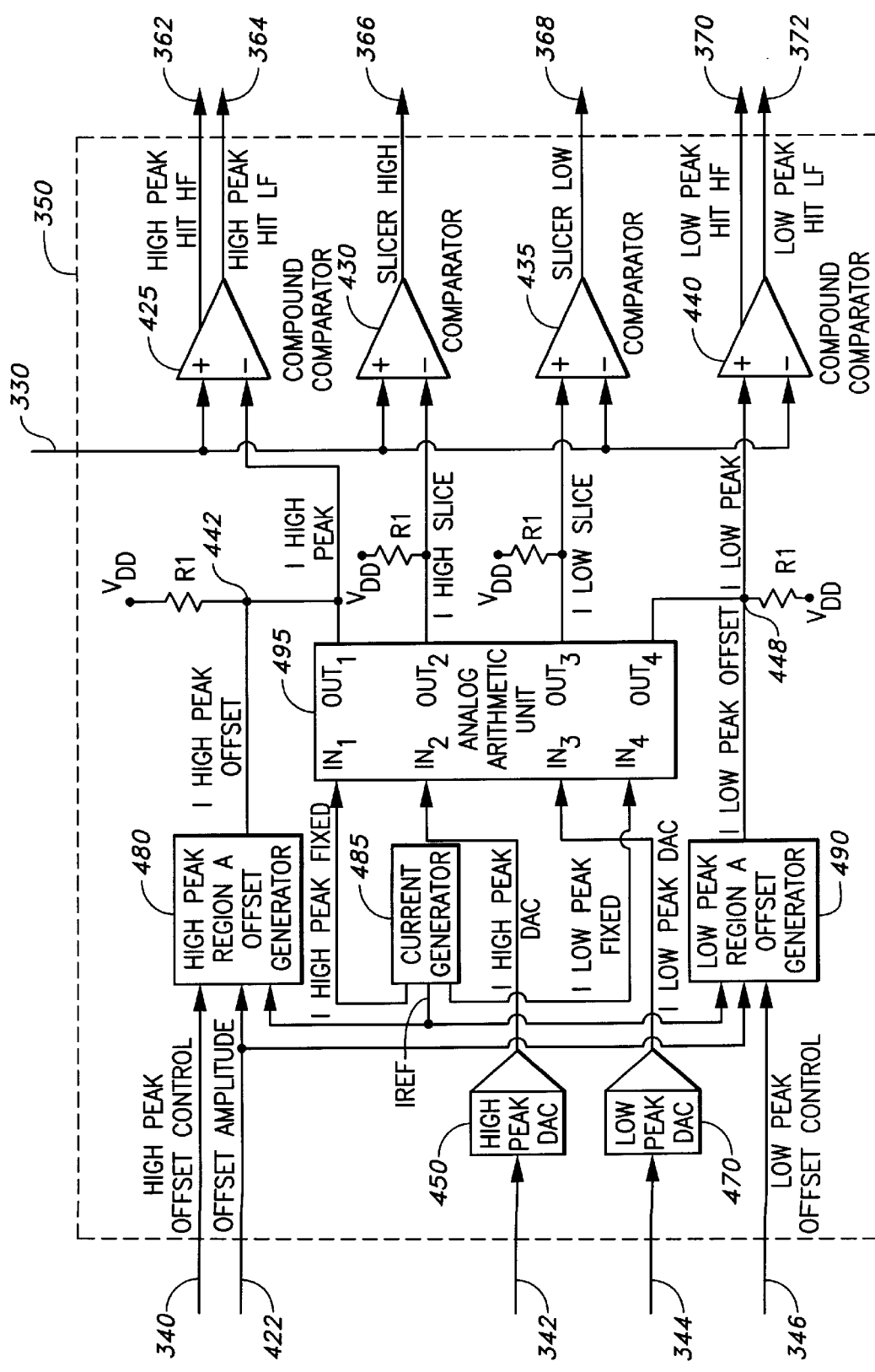
FIGS. 6A, 6B, and 6C are block diagrams showing details of the waveform analyzer stage of FIG. 5.

FIG. 6A shows waveform analyzer stage 350 according to a preferred embodiment of the invention. FIG. 6A labels the currents (I) that flow into and out of an analog arithmetic unit (AAU) 495. AAU 495 performs mathematical operations on the values of the currents entering AAU 495 via the "IN" terminals. Results of the operations performed by AAU 495 are placed on the "OUT" terminals. The "IN" terminals are current sources, and the "OUT" terminals are current sinks.

HIGH PEAK DAC 450 receives the signal HIGH PEAK DIGITAL CONTROL on bus 342 and has an output terminal for driving $I_{HIGH\ PEAK\ DAC}$. $I_{HIGH\ PEAK\ DAC}$ connects to AAU 495 at $IN_2$. LOW PEAK DAC 470 has an input terminal connected to LOW PEAK DIGITAL CONTROL on bus 344 and has an output terminal for driving $I_{LOW\ PEAK\ DAC}$. $I_{LOW\ PEAK\ DAC}$ connects to AAU 495 at $IN_3$.

Current generator 485 has two output terminals for driving $I_{HIGH\ PEAK\ FIXED}$ and $I_{LOW\ PEAK\ FIXED}$. $I_{HIGH\ PEAK\ FIXED}$ connects to AAU 495 at $IN_1$. $I_{LOW\ PEAK\ FIXED}$ connects to AAU 495 at $IN_4$. $I_{HIGH\ PEAK\ FIXED}$ and $I_{LOW\ PEAK\ FIXED}$ are chosen such that the four outputs of AAU 495 are referenced from common mode level 1000 (see FIG. 16) of data 335 (see FIG. 5). Common mode level 1000 is not zero volts in the preferred embodiment but is set at a positive voltage. All voltages in waveform 335 are positive in the preferred embodiment.

AAU 495 processes the current values from $IN_1$ and $IN_2$ and places the result on $OUT_1$. The current on $OUT_1$ is $I_{HIGH\ PEAK}$. Using AAU 495 input currents, equation 1 is a mathematical representation of the analog operations of AAU 495 for $OUT_1$.

$$I_{HIGH\ PEAK} = I_{HIGH\ PEAK\ FIXED} + I_{HIGH\ PEAK\ DAC} \quad (1)$$

AAU 495 processes the current values from $IN_3$ and $IN_4$ and places the result on $OUT_4$. The current on $OUT_4$ is $I_{LOW\ PEAK}$. Using AAU 495 input currents, equation 2 is a mathematical representation of the analog operations of AAU 495 for $OUT_4$.

$$I_{LOW\ PEAK} = I_{LOW\ PEAK\ FIXED} + I_{LOW\ PEAK\ DAC} \quad (2)$$

AAU 495 processes the current values from $IN_1$, $IN_2$, $IN_3$ and $IN_4$ and places the result on $OUT_2$. The current on $OUT_2$ is $I_{HIGH\ SLICE}$. The value of $I_{HIGH\ SLICE}$ is represented in equation 3A. Using AAU 495 input currents, equation 3A is a mathematical representation of the analog addition operations of AAU 495 for $OUT_2$.

$$I_{HIGH\ SLICE} = \tfrac{3}{4}(I_{HIGH\ PEAK\ FIXED} + I_{HIGH\ PEAK\ DAC}) + \tfrac{1}{4}(I_{LOW\ PEAK\ FIXED} + I_{LOW\ PEAK\ DAC}) \quad (3A)$$

Alternatively, the value of $I_{HIGH\ SLICE}$ can be expressed using $OUT_1$ and $OUT_4$ in equations 3B and 3C.

$$I_{HIGH\ SLICE} = \tfrac{3}{4}(I_{HIGH\ PEAK}) + \tfrac{1}{4}(I_{LOW\ PEAK}) \quad (3B)$$

$$I_{HIGH\ SLICE} = I_{HIGH\ PEAK} - \tfrac{1}{4}(I_{HIGH\ PEAK} - I_{LOW\ PEAK}) \quad (3C)$$

Finally, AAU 495 processes the current values from $IN_1$, $IN_2$, $IN_3$ and $IN_4$ and places the result on $OUT_3$. The current on $OUT_3$ is $I_{LOW\ SLICE}$. The value of $I_{LOW\ SLICE}$ is represented in equation 4A. Using AAU 495 input currents, equation 4A is a mathematical representation of the analog addition operations of AAU 495 for $OUT_3$.

$$I_{LOW\ SLICE} = \tfrac{3}{4}(I_{LOW\ PEAK\ FIXED} + I_{LOW\ PEAK\ DAC}) + \tfrac{1}{4}(I_{HIGH\ PEAK\ FIXED} + I_{HIGH\ PEAK\ DAC}) \quad (4A)$$

Alternatively, the value of $I_{LOW\ SLICE}$ can be expressed using $OUT_1$ and $OUT_4$ in equations 4B and 4C.

$$I_{LOW\ SLICE} = \tfrac{3}{4}(I_{LOW\ PEAK}) + \tfrac{1}{4}(I_{HIGH\ PEAK}) \quad (4B)$$

$$I_{LOW\ SLICE} = I_{LOW\ PEAK} + \tfrac{1}{4}(I_{HIGH\ PEAK} - I_{LOW\ PEAK}) \quad (4C)$$

High peak REGION A offset generator 480 has an input terminal connected to $I_{REF}$. $I_{REF}$ flows from current generator 485 and is enough current to cause a maximum preferred voltage drop across R1 of 20 millivolts. High peak REGION A offset generator 480 has an input terminal connected to HIGH PEAK OFFSET CONTROL on line 340 which gates on and off the added voltage drop across R1. Compound comparator 425 has the voltage $V_{HIGH\ PEAK}$ connected to the reference (−) terminal. $V_{HIGH\ PEAK}$ is the signal "HIGH PEAK", where the voltage $V_{HIGH\ PEAK}=V_{DD}-R1\ (I_{HIGH\ PEAK})$ as shown in equation (5) herein below. The output of high peak REGION A offset generator 480 is $I_{HIGH\ PEAK\ OFFSET}$. At analog summing node 442, $I_{HIGH\ PEAK\ OFFSET}$ sums with $I_{HIGH\ PEAK}$ to boost $V_{HIGH\ PEAK}$ in REGION A (the high frequency region) of pulse 335H.

Low peak REGION A offset generator 490 has an input terminal connected to $I_{REF}$. $I_{REF}$ flows from current generator 485 and is enough current to cause a maximum voltage drop of 20 millivolts (preferred value) across R1. Low peak REGION A offset generator 490 has an input terminal connected to LOW PEAK OFFSET CONTROL on line 346 which gates on and off the added voltage drop across R1. Compound comparator 440 has the voltage $V_{LOW\ PEAK}$ connected to the reference (−) terminal. $V_{LOW\ PEAK}$ is the signal "LOW PEAK" where the voltage $V_{LOW\ PEAK}=V_{DD}-R1\ (I_{LOWPEAK})$ as shown in equation (9) herein below. The output of low peak REGION A offset generator 490 is $I_{LOW\ PEAK\ OFFSET}$. At analog summing node 448, $I_{LOW\ PEAK\ OFFSET}$ sums with $I_{LOW\ PEAK}$ to boost $V_{LOW\ PEAK}$ in REGION A (the high frequency region) of pulse 335L.

Line 330 carries waveform 335 (see FIG. 5) into waveform analyzer stage 350. Line 330 is connected to four voltage comparators. Line 330 is connected to the positive input terminals of compound comparator 425 and comparator 430. And line 330 is connected to the negative input terminals of comparator 435 and compound comparator 440.

A comparator compares two analog voltage inputs and outputs a binary voltage signal. If the voltage level at the positive terminal of a comparator is greater than the voltage level at the reference terminal (i.e., the negative terminal), then the comparator outputs a digital HIGH value. If the voltage level at the positive terminal of a comparator is less than the voltage at the reference terminal, then the comparator outputs a digital LOW value. Comparators are further described in Horowitz, Paul and Hill, Winfield, *The Art Of Electronics* (2nd ed.), Cambridge University Press, New York, N.Y. (1996), which is fully incorporated herein by reference thereto as if repeated verbatim immediately hereinafter.

Compound comparator 425 has the voltage $V_{HIGH\ PEAK}$ connected to the reference terminal. $V_{HIGH\ PEAK}$ is the signal HIGH PEAK. $V_{HIGH\ PEAK(REG.\ A)}$ is the signal "HIGH-PEAK(REGION A)". The details of compound comparator 425 are discussed below in conjunction with FIGS. 6B and 6C. Compound comparator 425 drives the HIGH PEAK HIT HIGH FREQUENCY binary signal on line 362 and the HIGH PEAK HIT LOW FREQUENCY binary signal on line 364.

The signal HIGH PEAK, i.e., the value of $V_{HIGH\ PEAK}$, is expressed in equation 5 for REGION C. $V_{HIGH\ PEAK(REG.\ A)}$ is expressed in Equation 6 for REGION A. $V_{DD}$ is the voltage from the power supply of adaptive equalizer system 300.

$$V_{HIGH\ PEAK}=V_{DD}-R1(I_{HIGH\ PEAK}) \tag{5}$$

$$V_{HIGH\ PEAK\ (REG.\ A)}=V_{DD}-R1(I_{HIGH\ PEAK})+R1 \\ (I_{HIGH\ PEAK\ OFFSET}) \tag{6}$$

Comparator 430 has the voltage $V_{HIGH\ SLICE}$ connected to the reference terminal. Comparator 430 drives a "SLICER HIGH" binary signal on line 366. Derived from equations 3B and 3C, the value of $V_{HIGH\ SLICE}$ is expressed in equations 7A and 7B.

$$V_{HIGH\ SLICE}=\tfrac{3}{4}(V_{HIGH\ PEAK})+\tfrac{1}{4}(V_{LOW\ PEAK}) \tag{7A}$$

$$V_{HIGH\ SLICE}=V_{HIGH\ PEAK}-\tfrac{1}{4}(V_{HIGH\ PEAK}-V_{LOW\ PEAK}) \tag{7B}$$

Comparator 435 has the voltage $V_{LOW\ SLICE}$ connected to the reference terminal. Comparator 435 drives a SLICER LOW binary signal on line 368. Derived from equation 4B and 4C, the value of $V_{LOW\ SLICE}$ is expressed in equations 8A and 8B.

$$V_{LOW\ SLICE}=\tfrac{3}{4}(V_{LOW\ PEAK})+\tfrac{1}{4}(V_{HIGH\ PEAK}) \tag{8A}$$

$$V_{LOW\ SLICE}=V_{LOW\ PEAK}+\tfrac{1}{4}(V_{HIGH\ PEAK}-V_{LOW\ PEAK}) \tag{8B}$$

Compound comparator 440 has the voltage $V_{LOW\ PEAK}$ connected to the reference terminal (refer to the discussion below in conjunction with FIGS. 6B and 6C, which teach the details of compound comparator 425). Compound comparator 440 drives a LOW PEAK HIT HIGH FREQUENCY binary signal on line 370 and a LOW PEAK HIT LOW FREQUENCY binary signal on line 372.

The signal LOW PEAK is $V_{LOW\ PEAK}$, which is expressed in equation 9 for REGION C. The signal "LOW-PEAK (REGION A)" is $V_{LOW\ PEAK\ (REG.\ A)}$, which is expressed in equation 10 for REGION A.

$$V_{LOW\ PEAK}=V_{DD}-R1(I_{LOW\ PEAK}) \tag{9}$$

$$V_{LOW\ PEAK(REG.\ A)}=V_{DD}-R1(I_{LOW\ PEAK})-R1 \\ (I_{LOW\ PEAK\ OFFSET}) \tag{10}$$

Figure 6B:
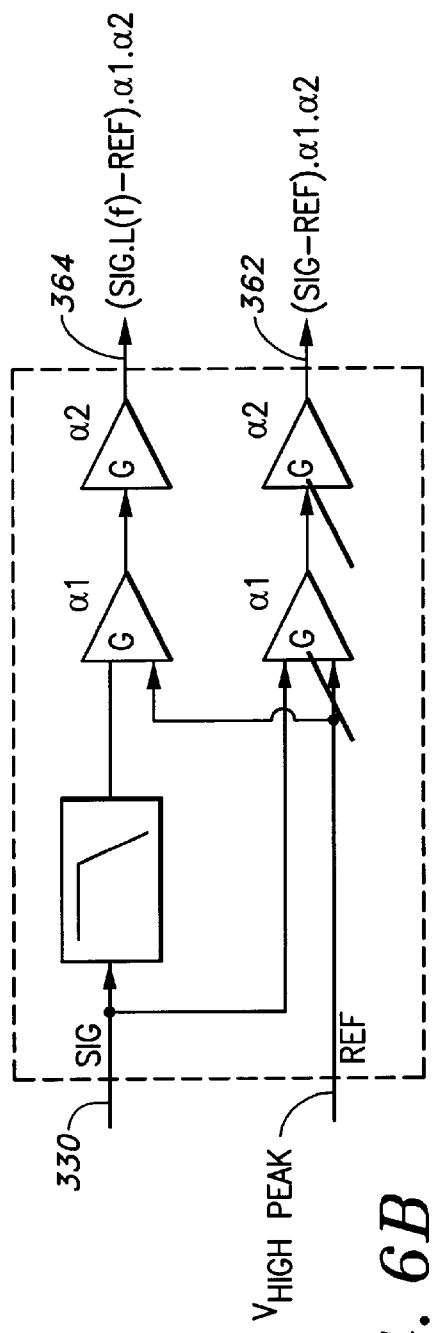

FIG. 6B shows compound comparator 425 according to a functional implementation of the circuit. FIG. 6B shows compound comparator 425 with two input lines, a signal (SIG) and a reference (REF). SIG is on the (+) input terminal and is connected to line 330 which carries waveform 335. REF is on the (−) input terminal and is attached to $V_{HIGH\ PEAK}$, the HIGH PEAK signal.

Compound comparator 425 has two output lines, line 362 and line 364. When a positive high pulse 335H on SIG is greater than the REF voltage level, line 362 goes HIGH, i.e., the signal HIGH PEAK HIT HIGH FREQUENCY (HF) is HIGH. Stated another way, HIGH PEAK HIT HF goes HIGH when the peak of the waveform 335H crosses HIGH PEAK in REGION A or REGION B.

The signal "HOVS" or high overshoot is derived from HIGH PEAK HIT HF and is described below in conjunction with FIG. 9. For each positive pulse, if HIGH PEAK HIT HF goes from a LOW to a HIGH during an eight (8) nanosecond window, defined from the midlevel of the leading rising edge 335H, then this event is registered in the digital machine as a high overshoot (HOVS) in REGION A. It is the LOW to HIGH transition which is registered so as only one HOVS can be registered for each high pulse.

The circuitry of compound comparator 425 which has HIGH PEAK HIT HF as an output has high gain bandwidth characteristics since its function is to register voltage overshoots of short time duration and small amplitude occurring at the peaks of positive leading edge pulses. Using gain stages (G) with amplifications of $\alpha_1$ and $\alpha_2$, the output signal of line 362 is shown in equation 11.

$$(SIG-REF)\cdot\alpha_1\cdot\alpha_2 \tag{11}$$

Because crosstalk and noise tends to be present in the high frequencies of the data, a low-pass filter will remove most of these artifacts. The invention tracks the average peak of the low frequency content of the incoming data pulses. In part, this is accomplished by looking for occurrences of the positive waveform 335H peak in REGION C (see FIG. 18) which are greater than the REF voltage of the compound comparator. Since the machine looks for any edge transition of the compound comparator output in REGION C, this implies that if the data has high frequency noise or crosstalk superimposed on the signal, the machine would tend to track the noise peaks in the high frequency part of the signal instead of the true data peaks. In order to escape from this difficulty, the compound comparator has a parallel path with HIGH PEAK HIT LF on line 364 as an output. This path has a low-pass filter introduced which significantly reduces the amplitude of high frequency information, thus making it possible to track the true low frequency peak of the incoming data.

When REF is connected to HIGH PEAK, line 364 goes HIGH, i.e., the signal HIGH PEAK HIT LOW FREQUENCY (LF) is HIGH, when the waveform crosses HIGH PEAK in REGION C. A low-pass filter, L(f), is used in the circuit to detect waveform crossings above HIGH PEAK in the low frequency regions of waveform 335H, i.e., REGION C (see FIG. 18). The output of line 364 is shown in equation 12.

$$(SIG \cdot L(f) - REF) \cdot \alpha_1 \cdot \alpha_2 \qquad (12)$$

Figure 6C:
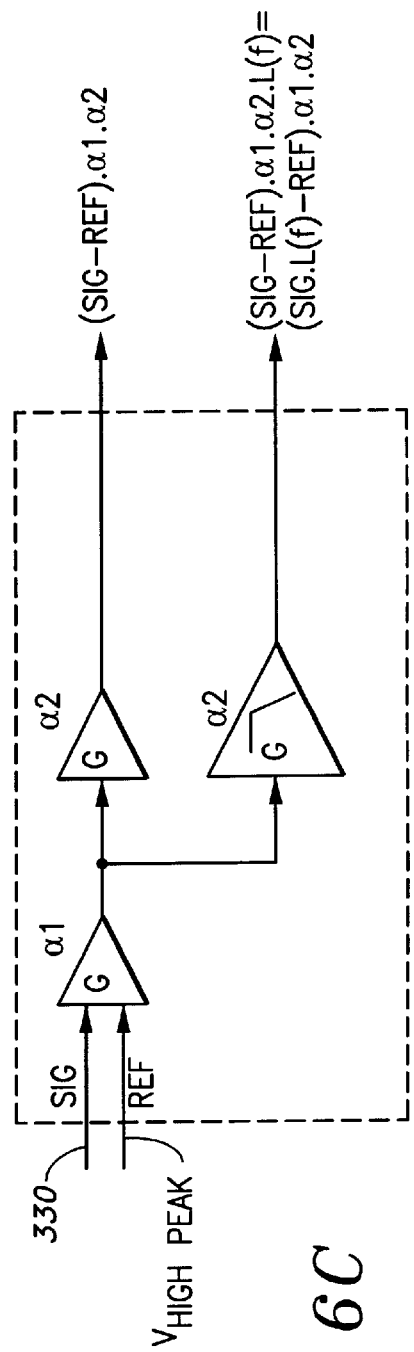

FIG. 6C shows a Compound comparator 425 according to a preferred implementation of the circuit. For the circuit in FIG. 6B, it is self-evident that the output of line 362 is expressed in equation 11. The output of line 364 is shown in equation 13.

$$(SIG - REF) \cdot \alpha_1 \cdot \alpha_2 \cdot L(f) \qquad (13)$$

Equation 13 is mathematically equivalent to equation 12. This is shown in the derivation of equation 12 using equations 13, 14, and 15. Equation 14 is simply an expansion of equation 13.

$$SIG \cdot \alpha_1 \cdot \alpha_2 \cdot L(f) - REF \cdot \alpha_1 \cdot \alpha_2 \cdot L(f) \qquad (14)$$

Applying a low-pass filter to a DC voltage yields the same result as not applying the low-pass filter. This is shown in equation 15. Factoring out $\alpha_1 \cdot \alpha_2$ yields equation 12.

$$SIG \cdot \alpha_1 \cdot \alpha_2 \cdot L(f) - REF \cdot \alpha_1 \cdot \alpha_2 \qquad (15)$$

Delay Line Calibration Circuit Description

Figure 7:
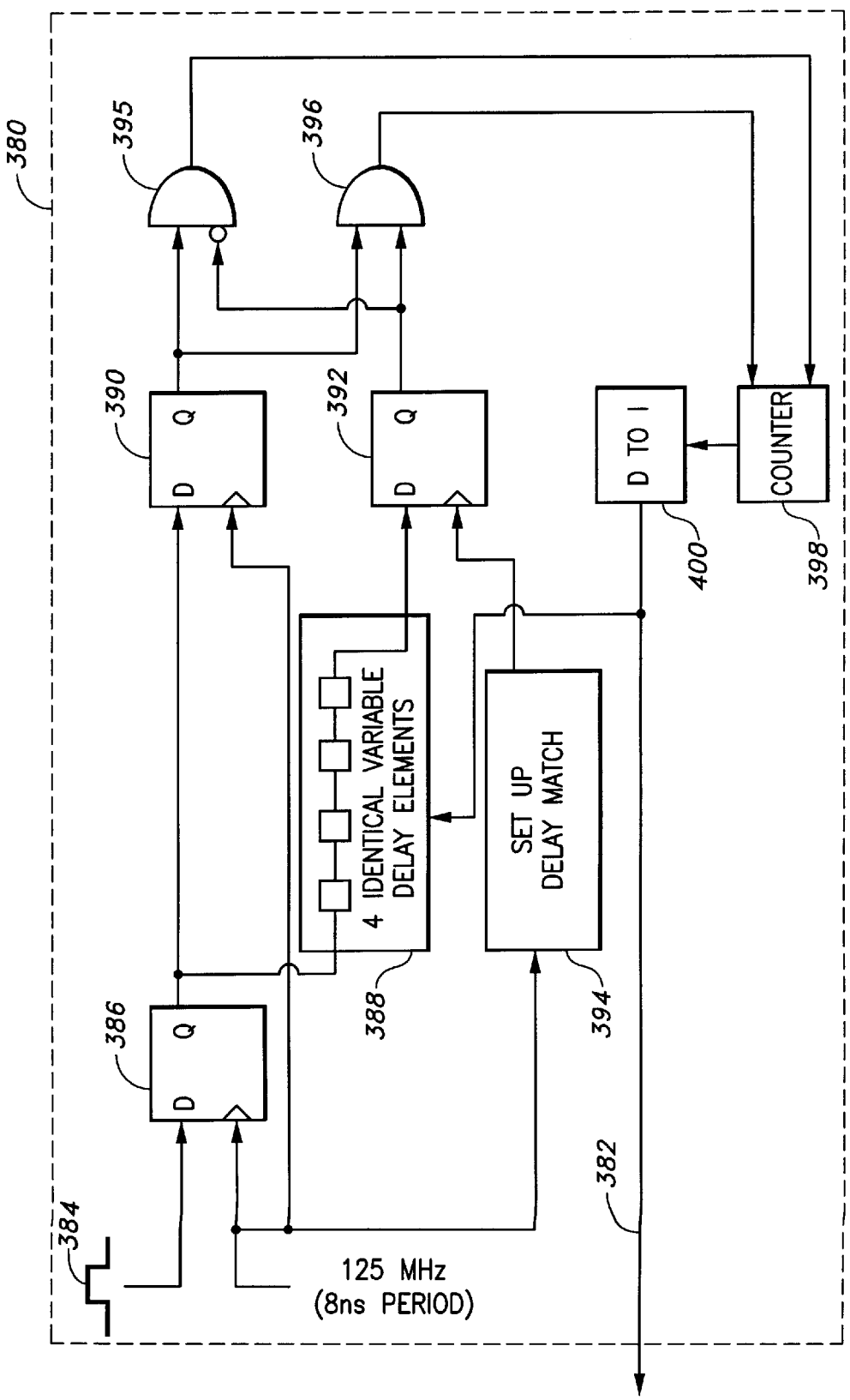
FIG. 7 is a block diagram showing details of the delay line calibration Circuit of FIG. 5.

FIG. 7 shows a delay line calibration circuit 380 according to a preferred embodiment of the invention. The output of circuit 380, DELAY LINE BIAS, goes over line 382 into digital logic control stage 405. A pulse 384 is generated every one microsecond. Pulse 384 enters capture flip-flop 386 and is synchronized with a 125 megahertz clock. Pulse 384 then enters flip-flop 390 and, concurrently, eight nanoseconds delay line 388. After eight nanoseconds, pulse 384 enters flip-flop 392. Set-Up and Delay Match 394 cancels the effect of clock to Q delay of synchronizer and setup requirement of capture flip-flop 386.

When flip-flop 390 is high and flip-flop 392 is high, delay line 388 needs to be incremented. When flip-flop 390 is high, and flip-flop 392 is low, delay line 388 needs to be decremented. AND gates 395 and 396 increment or decrement counter 398. Counter 398 outputs a signal to digital to current (D/I) converter 400. D/I 400 outputs a current which drives delay line 388 and increments or decrements the delay line bias. DI400 drives the signal DELAY LINE BIAS over line 382 which goes to the delay elements in the synchronizer/region definer 550 (FIG. 9) of digital logic control stage 405.

Digital Logic Control Stage Description

Figure 8A:
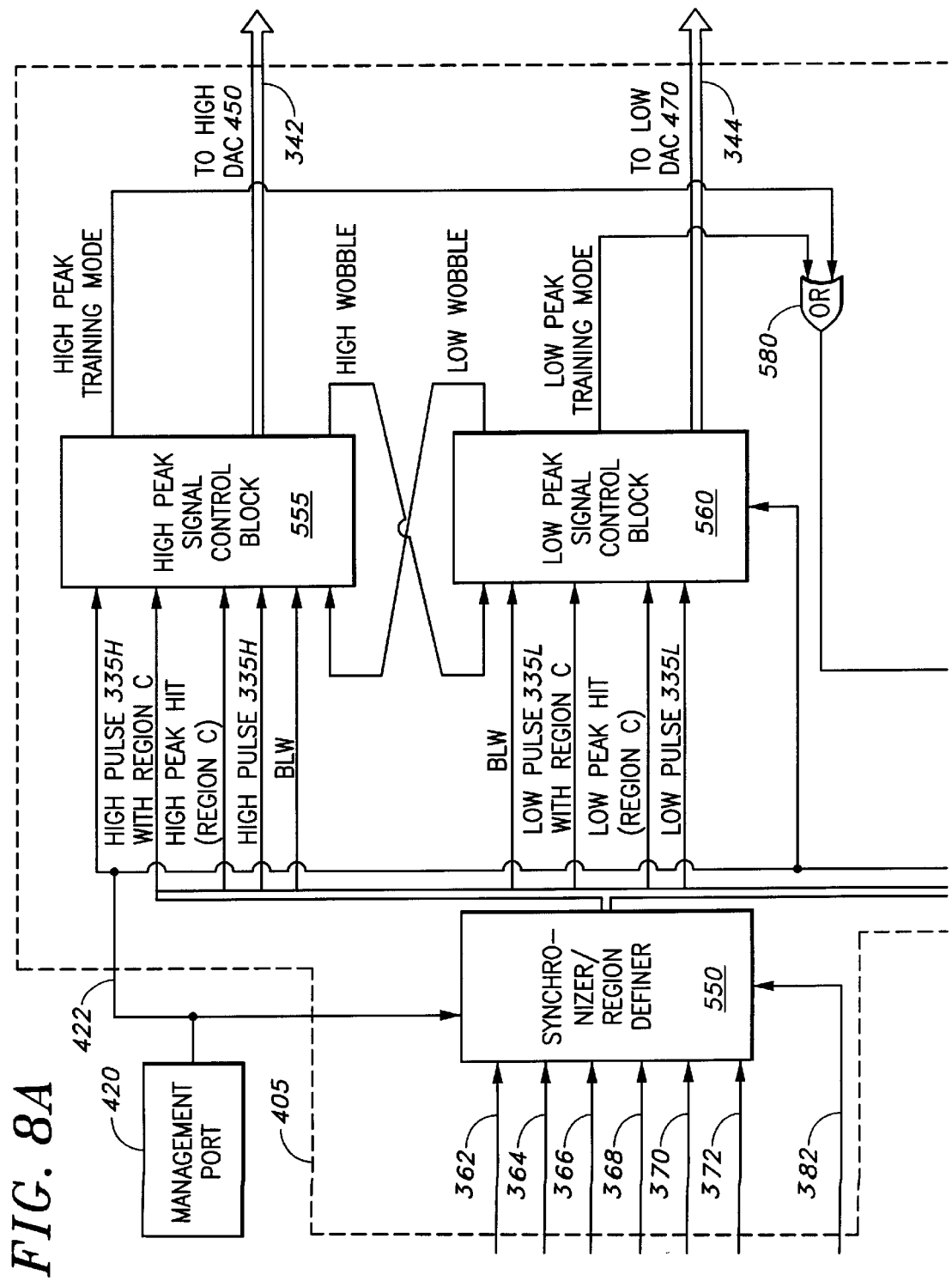
FIG. 8 is a block diagram showing details of the digital control logic stage of FIG. 5.

FIG. 8 shows digital logic control stage 405 according to a preferred embodiment of the invention, which includes: "synchronizer/region definer" 550, "HIGH PEAK control block" 555, "LOW PEAK control block" 560, "equalizer control block" 565, and "baseline wander (BLW) control block" 570. Each of these elements receives control parameters from management port 420. BLW control block 570 receives various input signals and drives BLW DAC 417.

Synchronizer/region definer 550 receives signals from waveform analyzer stage 350 on lines 362, 364, 366, 368, 370, and 372. Synchronizer/region definer 550 generates output signals to HIGH PEAK control block 555, LOW PEAK control block 560, equalizer control block 565 and BLW control block 570. Block 550 also generates a HIGH PEAK OFFSET CONTROL signal on line 340 and a LOW PEAK OFFSET CONTROL signal on line 346. Lines 340 and 346 go to waveform analyzer stage 350 (see FIG. 6A). Synchronizer/region definer 550 is further described below in conjunction with FIG. 9.

HIGH PEAK control block 555 receives a signal indicating propagation of high pulse 335H with REGION C (see FIG. 18), a "HIGH PEAK HIT (REGION C)" signal, and a signal indicating propagation of a high pulse 335H (with or without REGION C). The low frequency components of a high pulse 335H (or of a low pulse 335L) define REGION C. HIGH PEAK control block 555 sources signal HIGH PEAK DIGITAL CONTROL on bus 342 to HIGH PEAK DAC 450. Block 555 also sources the signal "HIGH PEAK HIT TRAINING MODE" to the second input terminal of OR gate 580. HIGH PEAK control block 555 is further described below in conjunction with FIG. 10.

LOW PEAK control block 560 receives a signal indicating propagation of a low pulse 335L with REGION C (see FIG. 18), a "LOW PEAK HIT (REGION C)" signal and a signal indicating propagation of a low pulse 335L (with or without REGION C). LOW PEAK Control block 560 sources LOW PEAK DIGITAL CONTROL on bus 344 to LOW PEAK DAC 470. LOW PEAK block 560 also sources the signal "LOW PEAK HIT TRAINING MODE" to the first input terminal of OR gate 580. LOW PEAK control block 560 is further described below in conjunction with FIG. 11.

Equalizer control block 565 receives a "PULSE CYCLE" signal (which indicates propagation of one MLT-3 pulse cycle of output waveform 335), a "high overshoot" ("HOVS") signal and a "low overshoot" ("LOVS") signal (see FIG. 9). HIGH PEAK control block 555 outputs the signal "HIGH PEAK TRAINING MODE" and the LOW PEAK control block 560 outputs the signal "LOW PEAK TRAINING MODE," which are both sent to OR gate 580 to generate a "PEAK TRAINING MODE" signal input to block 565. Block 565 drives FILTER SELECT on line 415, GAIN ATTENUATOR on line 411, and BOOST SELECT on line 409. Block 565 also drives equalizer DAC 410 on bus 408. Finally, block 565 generates an "EQUALIZER TRAINING MODE" signal which goes to BLW control block 570. Equalizer control block 565 is further described below in conjunction with FIG. 12.

BLW control block 570 receives the following eight (8) input signals from synchronizer/region definer 550: HOVS, "SHORT HIGH PULSE," "MEDIUM HIGH PULSE," "END OF WIDE HIGH PULSE," LOVS, "SHORT LOW PULSE," "MEDIUM LOW PULSE," and "END OF WIDE LOW PULSE." Using the aforementioned six input signals from synchronizer/region definer 550 along with six (6) signals from waveform analyzer stage 350, BLW control block 570 generates a signal on bus 413 which drives BLW DAC 417. BLW control block 570 commands BLW DAC 417 to compensate for baseline wander, i.e., the DC shift of the incoming waveform 320 (see FIG. 5).

FIG. 9 shows details of synchronizer/region definer 550. Delay line elements 602, 604, 606, 608, and 609 are used to define REGION A, REGION B, and REGION C of a high pulse 335H. The delay line elements are set to the values shown in FIG. 9 according to the preferred embodiment. REGION A is defined as the first eight nanoseconds of a pulse. REGION B is defined as the second eight nanoseconds of a pulse (i.e., after REGION A). REGION C is defined as the part of a pulse sixteen (16) nanoseconds after REGION B.

An AND gate 600 has a first input terminal which receives the HIGH PEAK HIT LF signal from compound comparator 425 on line 364. The purpose of HIGH PEAK HIT LOW FREQUENCY (LF) is to filter out crosstalk and noise. AND gate 600 has a second input terminal which receives a SLICER HIGH signal on line 366 delayed by delay line elements 602, 604, and 606. AND gate 600 has a third input terminal which receives the SLICER HIGH signal delayed by delay line elements 602, 604, 606 and 608 and inverted by inverter 610. AND gate 600 has an output terminal which produces the "HIGH PEAK HIT (REGION C)" signal which goes to HIGH PEAK HIT Counter 665 (see FIG. 10) in HIGH PEAK control block 555. HIGH PEAK HIT Counter 665 is used to set HIGH PEAK DAC 450.

An AND gate 612 has a first input terminal which receives the HIGH PEAK HIT HF signal from compound comparator 425 on line 362; a second input terminal which receives a SLICER HIGH signal on line 366 delayed by delay line element 602 and inverter 613; and an output terminal which produces the HOVS signal. Since HIGH PEAK HIT HF signals that waveform 335H has crossed in either REGION A or REGION B, the purpose of HOVS is to detect high overshoot (HOVS) in REGION A only. REGION A is the high frequency region of pulse 335H (see FIG. 18).

As already stated above, HOVS or high overshoot is derived from HIGH PEAK HIT HF. For each positive pulse, if HIGH PEAK HIT HF goes from a LOW to a HIGH during an eight (8) nanosecond(ns) window, defined from the midlevel of the rising leading edge 335H, then this event is registered in the digital machine as a high overshoot (HOVS) in REGION A. It is the LOW to HIGH transition which is registered so as only one HOVS can be registered for each high pulse 335H. The HOVS signal is sent to equalizer control block 565 and BLW control block 570.

An AND gate 632 has a first input terminal which receives a SLICER HIGH signal on line 366 delayed by delay line elements 602 and 604. A second input terminal receives a SLICER HIGH signal through inverter 634. The output terminal produces SHORT HIGH PULSE which goes to BLW control block 570. SHORT HIGH PULSE goes HIGH when a high pulse that is less than or equal to 8ns wide is detected; i.e., SLICER HIGH goes HIGH for 8 ns when an 8 ns pulse is detected on waveform 335H. After 8 ns, SLICER HIGH goes LOW. Thus, after 12 ns, the first input terminal of AND gate 632 will be HIGH (because SLICER HIGH has propagated through delay lines 602 and 604), and the second input terminal of AND gate 632 will be HIGH (because SLICER HIGH has gone LOW so that the output of inverter 634 is HIGH), thereby making a the output of AND gate 632 HIGH. The extra 4 ns is added to avoid erroneous detection due to jitter and calibration error.

An AND gate 640 has a first input terminal which receives a SLICER HIGH signal on line 366 delayed by delay line element 602. A second input receives a SLICER HIGH signal delayed by delay line elements 602, 604, and 606. The output terminal produces a MEDIUM HIGH PULSE signal which goes to BLW control block 570. MEDIUM HIGH PULSE goes HIGH when a high pulse greater than 8 ns and less than or equal to 16 ns wide is detected; i.e., SLICER HIGH goes HIGH for 16 ns when a 16 ns pulse is detected on waveform 335H. After 16 ns SLICER HIGH goes LOW. Thus, after 16 ns, the first terminal of AND gate 640 will be HIGH and the second terminal of AND gate 640 will be HIGH, producing a HIGH signal from AND gate 640.

An AND gate 644 has a first input terminal which receives a SLICER HIGH signal on line 366 delayed by delay line elements 602. A second input terminal receives a SLICER HIGH signal through inverter 646. The output terminal produces an END OF HIGH WIDE PULSE signal which goes to BLW control block 570. END OF HIGH WIDE PULSE goes HIGH when a high pulse greater than 16 ns ends, i.e., after the trailing falling edge is detected. For example, SLICER HIGH goes LOW after a wide pulse has passed. Thus, after 8 ns, the first terminal of AND gate 644 will be HIGH and the second terminal of AND gate 644 will be HIGH, producing a HIGH signal from AND gate 644.

An AND gate 651 has a first input terminal which receives a SLICER HIGH signal on line 366. A second input terminal receives a SLICER HIGH signal delayed by delay elements 602, 604, 606, and 609 (19 ns delay). The output terminal produces a "HIGH PULSE WITH REGION C" signal which is received by the (+) terminal of high pulse counter 660 in HIGH PEAK control block 555. HIGH PULSE WITH REGION C goes HIGH when a high pulse is wide enough to have a REGION C (i.e., wider than 16 ns). For example, SLICER HIGH goes HIGH when a wide pulse is present so that the first terminal of AND gate 651 is HIGH. If after 19 ns, when the second terminal of AND gate 651 is HIGH, the first input terminal of AND gate 651 is still HIGH, then the output terminal of AND gate 651 will be HIGH.

Delay line elements 618, 624, 626, 628, and 629 are used to define REGION A, REGION B, and REGION C of a low pulse 335L. The delay line elements are set to the values shown in FIG. 9 according to the preferred embodiment. REGION A is defined as the first eight (8) nanoseconds of a pulse. REGION B is defined as the second eight (8) nanoseconds of a pulse (i.e., after REGION A). REGION C is defined as the part of the pulse sixteen (16) nanoseconds after REGION B.

An AND gate 622 has a first input terminal which receives a SLICER LOW signal on line 368 delayed by delay line elements 618, 624, 626 and 628 and inverted by inverter 630; a second input terminal which receives a SLICER LOW signal delayed by delay line elements 618, 624 and 626; and a third input terminal which receives the LOW PEAK HIT LF signal on line 372. The output terminal produces a "LOW PEAK HIT (REGION C)" signal which goes to LOW PEAK HIT counter 765 (see FIG. 11).

An AND gate 616 has a first input terminal which receives a SLICER LOW signal on line 368 delayed by delay line element 618, and a second input terminal which receives the inverted LOW PEAK HIT LF signal on line 370, and an output terminal which produces the LOVS signal. Since LOW PEAK HIT HF signals that waveform 335L has crossed in either REGION A or REGION B, the purpose of LOVS is to detect low overshoot (LOVS) in REGION A only. REGION A is the high frequency region of pulse 335L (see FIG. 18).

As already stated above, LOVS or low overshoot is derived from LOW PEAK HIT HF. For each low pulse, if LOW PEAK HIT HF goes from a LOW to a HIGH during an eight (8) nanosecond window, defined from the midlevel of the leading falling edge 335L, then this event is registered in the digital machine as a low overshoot (LOVS) in REGION A. It is the LOW to HIGH transition which is registered so as only one LOVS can be registered for each low pulse 335L. The LOVS signal is sent to Equalizer control block 565 (see FIG. 8) and BLW control block 570 (see FIG. 8).

An AND gate 636 has a first input terminal which receives a SLICER LOW signal on line 368 through inverter 638. A second input terminal receives a SLICER LOW signal delayed by delay line elements 618 and 624. The output terminal produces SHORT LOW PULSE signal which goes to BLW control block 570 (see FIG. 8). SHORT LOW PULSE goes HIGH when a low pulse that is less than or equal to 8 ns wide is detected.

An AND gate 642 has a first input terminal which receives a SLICER LOW signal on line 368 delayed by delay line element 618. A second input terminal receives a SLICER LOW signal delayed by delay line elements 618, 624, and 626. The output terminal produces a MEDIUM LOW PULSE signal which goes to BLW control block 570 (see FIG. 8). MEDIUM LOW PULSE goes HIGH when a low pulse greater than 8 ns and less than or equal to 16 ns wide is detected.

An AND gate 648 has a first input terminal which receives a SLICER LOW signal on line 368 through inverter 650. A second input terminal receives a SLICER LOW signal delayed by delay line elements 618 and 624. The output terminal produces an END OF LOW WIDE PULSE signal which goes to BLW Control block 570. END OF LOW WIDE PULSE goes HIGH when a low pulse greater than 16 ns ends.

An AND gate 654 has a first input terminal which receives a SLICER LOW signal on line 368. A second input terminal receives a SLICER LOW signal delayed by delay elements 618, 624, 626, and 629. The output terminal produces a "LOWPULSE WITH REGION C" signal which is received by the (+) terminal of low pulse counter 760 in LOW PEAK control block 560 (see FIG. 8). LOW PULSE WITH REGION C goes HIGH when a low pulse is wide enough to have a REGION C. For example, SLICER LOW goes HIGH when a wide pulse is present so that the first terminal of AND gate 654 is HIGH. If after 19 ns, when the second terminal of AND gate 654 is HIGH and if, the first input terminal of AND gate 654 is still HIGH, then the output terminal of AND gate 654 will be HIGH.

Preferably, delay line elements 602 and 618 each provides eight (8) nanoseconds of delay, while delay line elements 604, 606, 624 and 626 each provides four (4) nanoseconds of delay. Preferably, delay line elements 608 and 628 each provides sixteen (16) nanoseconds of delay. And preferably, delay line elements 609 and 629 each provides three (3) nanoseconds of delay. Delay elements 608 and 628 are currently implemented using flip-flop circuitry in the preferred embodiment of the invention.

Synchronizer/region definer control block 550 further includes a synchronizer (not shown) for synchronizing its output signals with a clock (not shown) in adaptive equalizer system 300.

Figure 10:
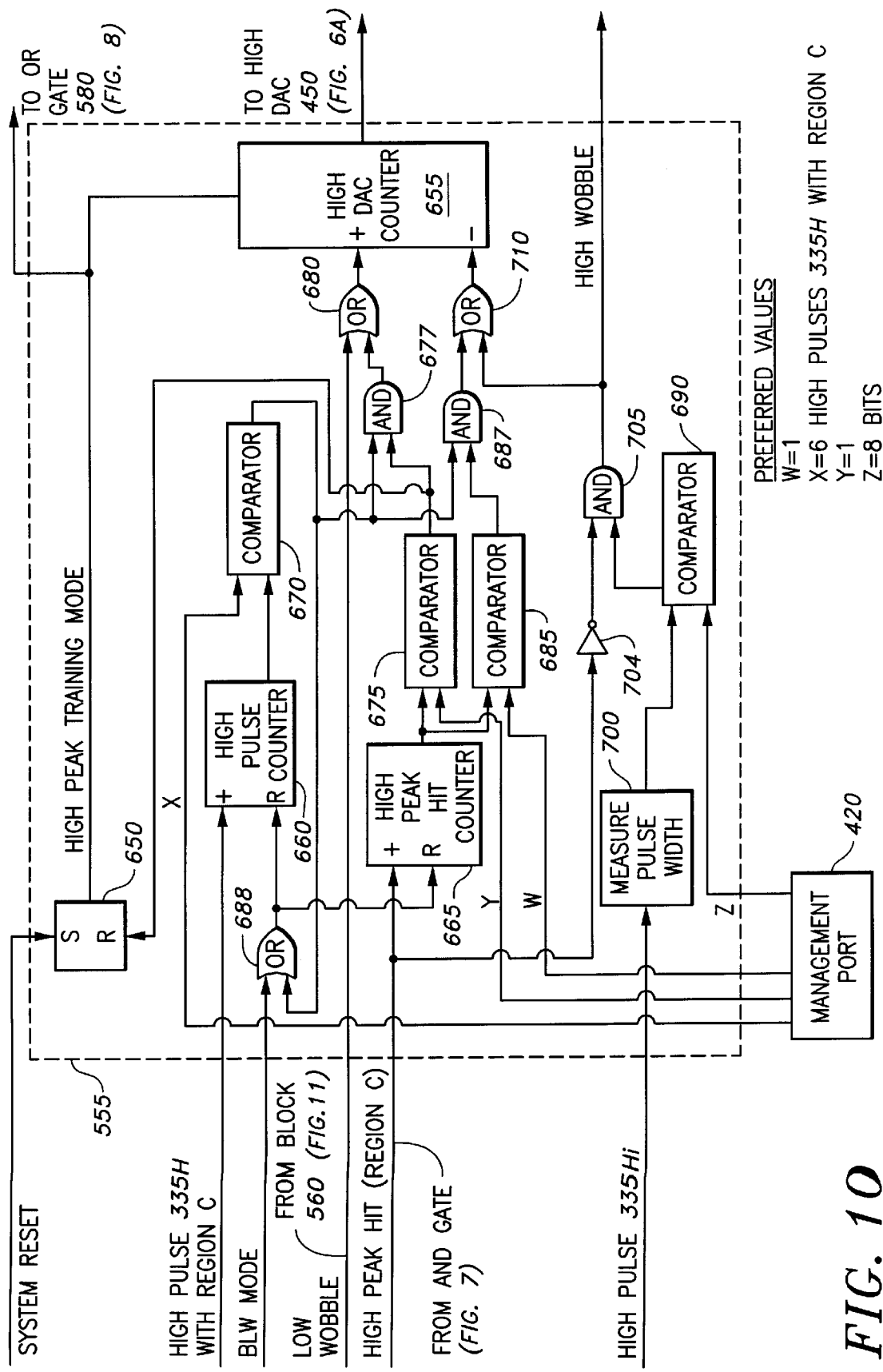
FIG. 10 shows elements of the HIGH PEAK signal control block of FIG. 5.

FIG. 10 shows high peak signal control block 555 according to a preferred embodiment of the invention. A set/reset (SR) flip-flop 650 has an "S" input terminal (which receives a "SYSTEM RESET" signal), and an "R" input terminal which receives the output of comparator 675. The output of SR flip-flop 650 drives a HIGH PEAK TRAINING MODE signal to OR gate 580 (FIG. 8) and to HIGH DAC counter 655 which drives HIGH PEAK DAC 450 (FIG. 6A).

A HIGH PULSE counter 660 counts the HIGH PULSE WITH REGION C (see FIG. 9) signals at the increment (+) input terminal, which counts the number of propagating high pulses 335H with REGION C. A HIGH PEAK HIT counter 665 counts the HIGH PEAK HIT (REGION C) signals at the increment (+) input terminal.

Comparator 670 has a first input terminal which receives a programmable variable "X" signal from management port 420, a second input terminal connected to the HIGH PULSE Counter 660 output terminal. The output terminal is connected to the second input terminal of OR gate 688, the first input terminal of AND gate 677, and the first input terminal of AND gate 687. Counters and comparators are further described in Horowitz, Paul and Hill, Winfield, *The Art Of Electronics* (2nd ed.), supra.

Comparator 675 has a first input terminal connected to the HIGH PEAK HIT counter 665 output terminal and a second input terminal which receives a programmable variable "Y" signal from management port 420. The output of comparator 675 goes to the second input terminal of AND gate 677 and the R terminal of SR flip-flop 650.

OR gate 680 has a first input terminal which receives a "LOW WOBBLE" signal from LOW PEAK control block 560 (FIG. 11), a second input terminal connected to the output terminal of AND gate 677, and an output terminal connected to the increment (+) input terminal of HIGH DAC Counter 655.

Comparator 685 has a first input terminal connected to the HIGH PEAK HIT counter 665 output terminal and a second input terminal which receives a programmable value "W" signal from management port 420. The output of comparator 685 goes to the second input of AND gate 687.

Comparator 690 has a first input terminal which receives a high pulse 335H via pulse width measurement circuit 700 and a second input terminal which receives a programmable value "Z" signal from management port 420. The output of comparator 690 goes to the second input terminal of AND gate 705.

AND gate 705 has a first input terminal which receives a HIGH PEAK HIT (REGION C) signal inverted by inverter 704, and a second input terminal connected to the output terminal of comparator 690. The output of AND gate 705 goes to the second input of OR gate 710 and is also output from block 555 as the signal "HIGH WOBBLE."

OR gate 710 has a first input terminal connected to the output terminal of AND gate 687, a second input terminal connected to the output terminal of AND gate 705, and an output terminal connected to the decrement (−) input terminal of HIGH DAC counter 655.

Figure 11:
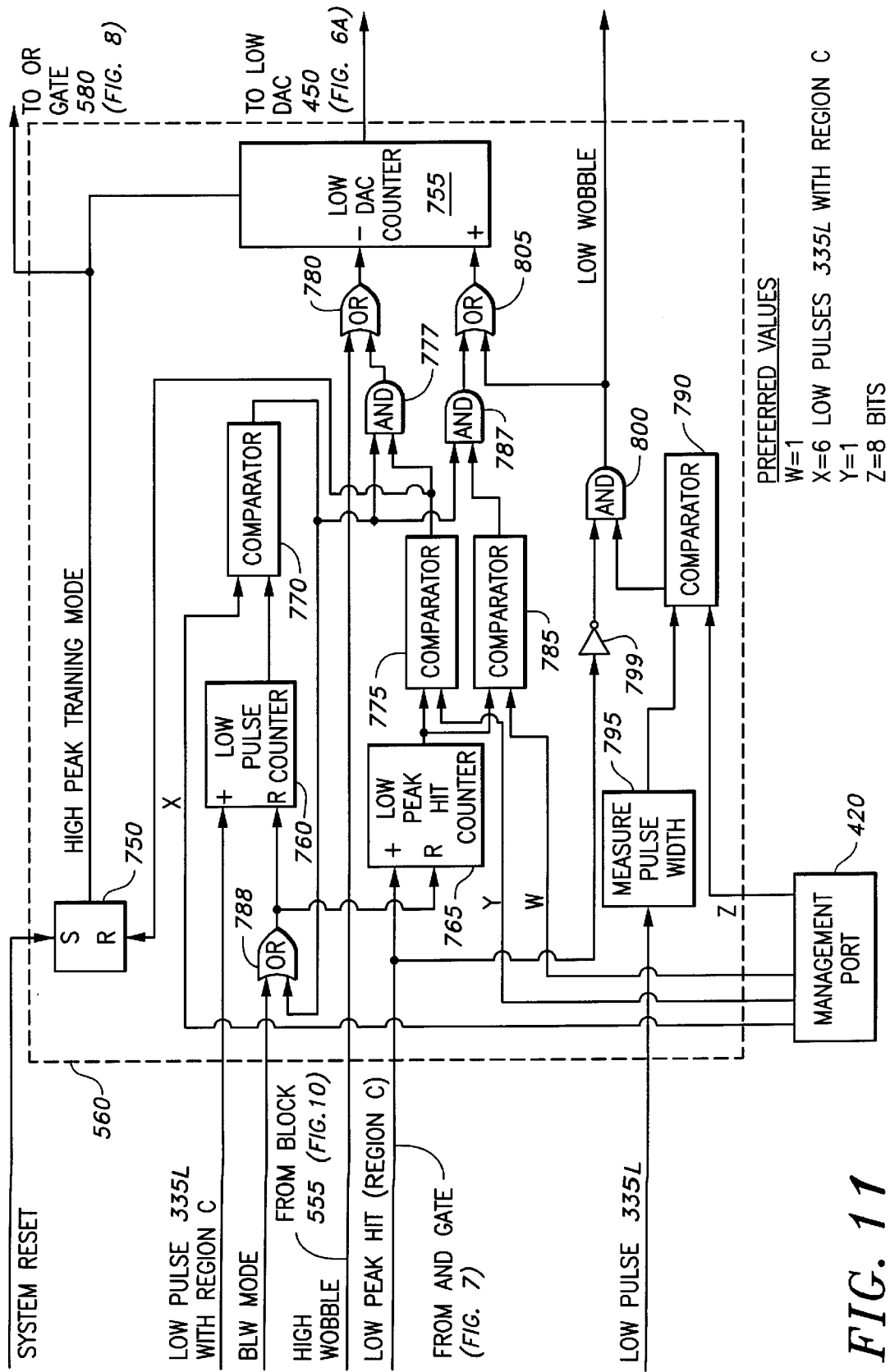
FIG. 11 shows elements of the LOW PEAK signal control block of FIG. 5.

FIG. 11 shows low peak signal control block 560 according to a preferred embodiment of the invention. A set/reset (SR) flip-flop 750 has an "S" input terminal (which receives a "SYSTEM RESET" signal), and an "R" input terminal which receives the output of comparator 775. The output of SR flip-flop 750 drives a LOW PEAK TRAINING MODE signal to OR gate 580 (FIG. 8) and to LOW DAC counter 755 which drives LOW PEAK DAC 470 (FIG. 6A).

LOW PULSE counter 760 counts the LOW PULSE WITH REGION C (see FIG. 9) signals at the increment (+) input terminal, which counts the number of propagating low pulses 335L with REGION C. A LOW PEAK HIT counter 765 counts the LOW PEAK HIT (REGION C) signals at the increment (+) input terminal.

Comparator 770 has a first input terminal which receives a programmable variable "X" signal from management port 420, a second input terminal connected to the LOW PULSE counter 760 output terminal. The output terminal is connected to the second input terminal of OR gate 788, the first input terminal of AND gate 777, and the first input terminal of AND gate 787.

Comparator 775 has a first input terminal connected to the LOW PEAK HIT counter 765 output terminal and a second input terminal which receives a programmable variable "Y" signal from management port 420. The output of comparator 775 goes to the second input terminal of AND gate 777 and the R terminal of SR flip-flop 750.

OR gate 780 has a first input terminal which receives a "HIGH WOBBLE" signal from HIGH PEAK control block 555 (FIG. 10), a second input terminal connected to the output terminal of AND gate 777, and an output terminal connected to the decrement (−) input terminal of LOW DAC counter 755.

Comparator 785 has a first input terminal connected to the LOW PEAK HIT counter 765 output terminal and a second input terminal which receives a programmable value "W" signal from management port 420. The output of Comparator 785 goes to the second input of AND gate 787.

Comparator 790 has a first input terminal which receives a low pulse 335H via pulse width measurement circuit 795 and a second input terminal which receives a programmable value "Z" signal from management port 420. The output of comparator 790 goes to the second input terminal of AND gate 800.

AND gate 800 has a first input terminal which receives a LOW PEAK HIT (REGION C) signal inverted by inverter 799, and a second input terminal connected to the output terminal of comparator 790. The output of AND gate 800 goes to the second input of OR gate 805 and is also output from block 555 as the signal "LOW WOBBLE."

OR gate 805 has a first input terminal connected to the output terminal of AND gate 787, a second input terminal connected to the output terminal of AND gate 800, and an output terminal connected to the increment (+) input terminal of LOW DAC counter 755.

Figure 12:
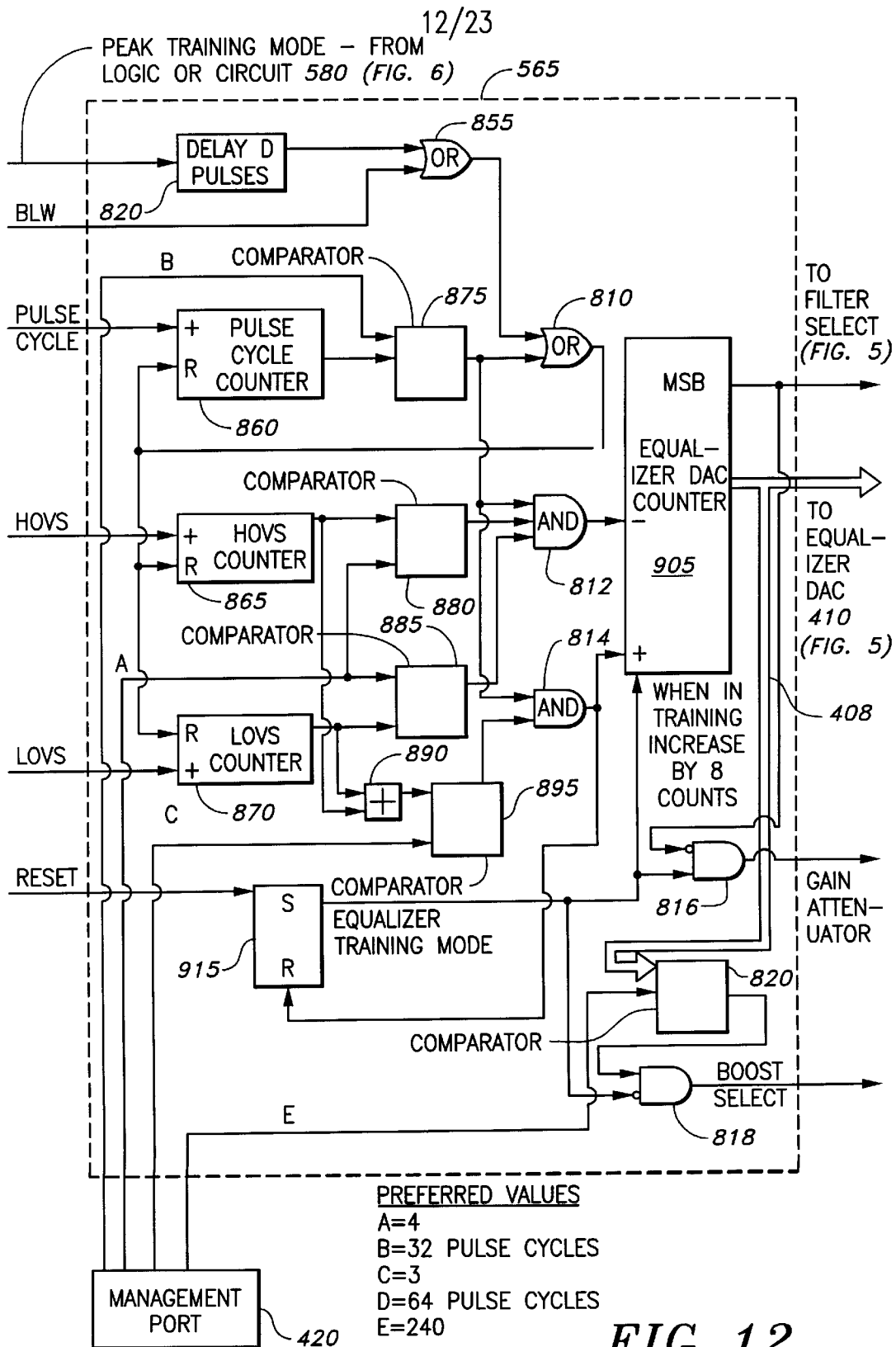
FIG. 12 shows elements of the equalizer control block of FIG. 5.

FIG. 12 shows equalizer control block 565 according to a preferred embodiment of the invention. The PEAK TRAINING MODE signal enters Delay D Pulses 820 and the output is sent to the first input of OR gate 855. The BLW MODE signal is sent to the second input of OR gate 855. The output of OR gate 855 is sent to the first input of OR gate 810. Pulse cycle counter 860 has an increment (+) terminal which receives the PULSE CYCLE signal, which indicates propagation of an MLT-3 pulse cycle of output waveform 335. HOVS counter 865 has an increment (+) terminal which receives the HOVS signal, while LOVS counter 870 has an increment (+) terminal which receives the LOVS signal. Comparator 875 has a first input terminal connected to the pulse cycle counter 860 output terminal, a second input terminal which receives a programmable "B" from management port 420 signal, and an output to the second input terminal of OR gate 810.

The first input terminal of OR gate 810 is connected to the output terminal of OR gate 855. The output terminal of OR gate 810 is connected to the reset (R) terminal of pulse cycle counter 860, the R terminal of HOVS counter 865, and the R terminal of LOVS counter 870. Comparator 880 has a first input terminal connected to the HOVS counter 865 output terminal and a second input terminal which receives a programmable "A" signal from management port 420.

Comparator 885 has a first input terminal connected to the LOVS counter 870 output terminal and a second input terminal which receives the programmable "A" signal. Adder 890 has a first input terminal connected to the LOVS counter 870 output terminal and a second input terminal connected to the HOVS counter 865 output terminal. Comparator 895 has a first input terminal connected to the adder 890 output terminal and a second input terminal which receives a programmable "C" signal from management port 420.

AND gate 812 has a first input terminal connected to the comparator 875 output terminal, a second input terminal connected to the comparator 880 output terminal, a third input terminal connected to the comparator 885 output terminal, and an output terminal connected to the decrement (−) terminal of an equalizer DAC counter 905.

AND gate 814 has a first input terminal connected to the comparator 875 output terminal, a second input terminal connected to the comparator 895 output terminal, and an output terminal connected to the increment (+) terminal of equalizer DAC counter 905.

SR flip-flop 915 has an "S" terminal which receives a "RESET" signal to "S" input terminal, the output of AND gate 814 to "R" input terminal, and an output terminal connected to equalizer DAC counter 905 for driving the EQUALIZER TRAINING MODE signal. When the invention is in adaptive equalizer training mode, the EQUALIZER TRAINING MODE signal commands the output of equalizer DAC counter 905 to increase by steps of eight (8).

The output of equalizer DAC counter 905 is sent on eight (8) bit bus 408 to equalizer DAC 410 and to the first input terminal of comparator 820. The second input terminal of comparator 820 receives a programmable "E" signal from management port 420. When the output of Equalizer DAC Counter 905 is greater than E, a HIGH is sent to the first input terminal of AND gate 818. The inverted EQUALIZER TRAINING MODE signal is sent to the second input terminal of AND gate 818. The output of AND gate 818 is sent to Equalizer 310 as the signal BOOST SELECT.

The FILTER SELECT signal is output from equalizer DAC counter 905 to equalizer 310 and carries the value of the most significant bit (MSB) of bus 408. The inverted FILTER SELECT signal is sent to the first input of AND gate 816. EQUALIZER TRAINING MODE is sent to the second input terminal of AND gate 816. The output of OR gate 816 is the GAIN ATTENUATOR signal which is sent to equalizer 310 (see FIG. 5).

Figure 13B:
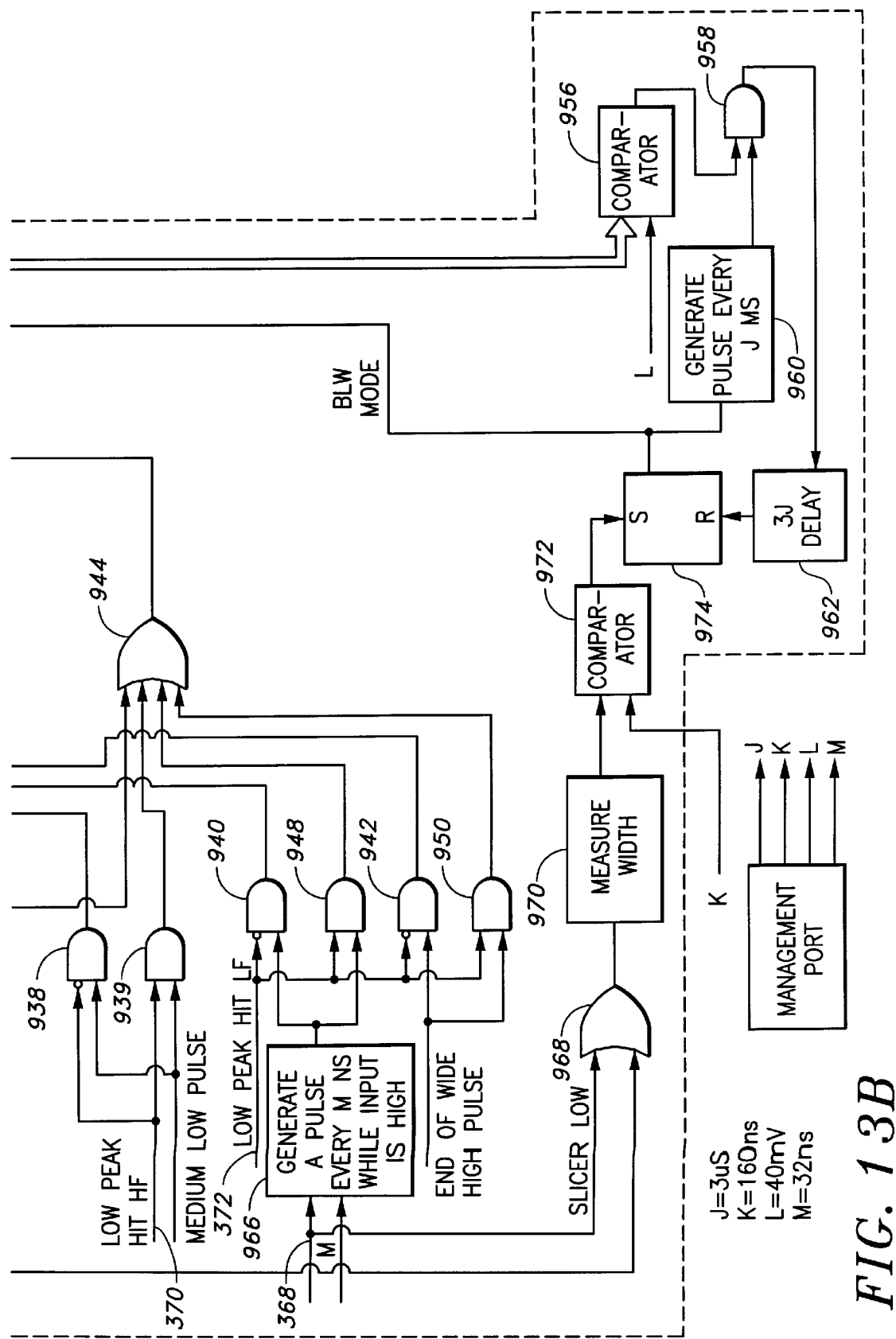
FIG. 13 shows elements of the baseline wander control BLW control block of FIG. 5.

FIG. 13 shows Baseline Wander (BLW) control block 570 according to a preferred embodiment of the invention. OR gate 920 has its first input terminal connected to the output terminal of AND gate 921, its second input terminal connected to the output terminal of AND gate 922, its third input terminal connected to the output terminal of AND gate 924, and its fourth input terminal connected to the output terminal of AND gate 926.

OR gate 928 has its first input terminal connected to the output terminal of AND gate 930, its second input terminal connected to the output terminal of AND gate 931, its third input terminal connected to the output terminal of AND gate 932, and its fourth input terminal connected to the output terminal of AND gate 934.

OR gate 936 has its first input terminal connected to the output terminal of AND gate 945, its second input terminal connected to the output terminal of AND gate 938, its third input terminal connected to the output terminal of AND gate 940, and its fourth input terminal connected to the output terminal of AND gate 942.

OR gate 944 has its first input terminal connected to the output terminal of AND gate 946, its second input terminal connected to the output terminal of AND gate 939, its third input terminal connected to the output terminal of AND gate 948, and its fourth input terminal connected to the output terminal of AND gate 950.

OR gate 952 has its output terminal connected to the decrement (−) terminal of the baseline wander digital-to-analog (BLW DAC) counter 953, its first input terminal connected to the output terminal of OR gate 928, and its second input terminal connected to the output terminal of OR gate 936.

OR gate 954 has its output terminal connected to the increment (+) terminal of BLW DAC counter 953, its first input terminal connected to the output terminal of OR gate 920, and its second input terminal connected to the output terminal of OR gate 944.

BLW DAC counter 953 has its output terminal connected to the input terminal of baseline wander digital-to-analog (BLW DAC) 417 via sixty-four (64) bit bus 413. BLW DAC 417 is implemented as a sixty-four (64) bit shift-register to operate at the fast rates and low switching noise to compensate for baseline wander.

The output of BLW DAC counter 953 is also connected to the first input terminal of comparator 956. The second input terminal of comparator 956 is conFIG.d to receive the programmable variable L. Typically, L is set to the digital equivalent of 40 millivolts.

AND gate 958 has its first input terminal connected to the output terminal of comparator 956, its second input terminal connected to a pulse generating stage 960, and its output terminal connected to a delay circuit 962. Stage 960 is a divide-by-N counter off of a one megahertz clock.

The following eight (8) input signals to BLW control block 570 (see FIG. 8) come from synchronizer/region definer 550: HOVS, SHORT HIGH PULSE, MEDIUM HIGH PULSE, END OF HIGH WIDE PULSE, LOVS, SHORT LOW PULSE, MEDIUM LOW PULSE, and END OF WIDE LOW PULSE. The following six (6) input signals to BLW control block 565 come from waveform analyzer stage 350: HIGH PEAK HIT HF on line 362, HIGH PEAK HIT LF on line 364, SLICER HIGH on line 366, SLICER LOW on line 368, LOW PEAK HIT HF on line 370, and LOW PEAK HIT LF on line 372.

HOVS is received by the first input terminal (note bubble) of AND gate 921 and the first input terminal of AND gate 930. SHORT HIGH PULSE is received by the second input terminal of AND gate 921 and the second input terminal of AND gate 930. SHORT HIGH PULSE depends on the output of comparator 430 (FIG. 6A) and delay elements 602 and 604 (FIG. 9). SHORT HIGH PULSE determines whether a pulse is less than or equal to twelve (12) nanoseconds wide.

HIGH PEAK HIT HF (line 362) is received by the first input terminal (note bubble) of AND gate 922 and by the first input terminal of AND gate 931. HIGH PEAK HIT LF (line 364) is received by the first input terminal (note bubble) of AND gate 924, by the first input terminal of AND gate 932, by the first input terminal (note bubble) of AND gate 926, and by the first input terminal of AND gate 934.

MEDIUM HIGH PULSE is received by the second input terminal of AND gate 922 and by the second input terminal of AND gate 931. MEDIUM HIGH PULSE depends on the output of comparator 430 (FIG. 6A) and delay elements 602, 604, and 606 (FIG. 9). MEDIUM HIGH PULSE determines whether a pulse is less than or equal to sixteen (16) nanoseconds wide.

SLICER HIGH is driven into the input terminal of pulse generator 964. SLICER HIGH detects the leading-rising-edge of a pulse 335H. When 335H is detected, pulse generator 964 will generate a clock-wide pulse every M nanoseconds while SLICER HIGH is HIGH in order to sample above the peak or below the peak of the 335H. The preferred value for M is twenty-four (24) nanoseconds. M must be a multiple of the clock rate and is implemented by using counters. Pulse generator 964 sends pulse signals to the second input terminal of AND gate 924 and the second input terminal of AND gate 932.

END OF HIGH WIDE PULSE is received by the second input terminal of AND gate 926 and by the second input terminal of AND gate 934.

LOVS is received by the first input terminal (note bubble) of AND gate 945 and the first input terminal of AND gate 946. SHORT LOW PULSE is received by the second input terminal of AND gate 945 and the second input terminal of AND gate 946. SHORT LOW PULSE depends on the output of comparator 435 (FIG. 6A) and delay elements 618 and 624 (FIG. 9). SHORT LOW PULSE determines whether a pulse is less than or equal to twelve (12) nanoseconds wide.

LOW PEAK HIT HF (line 370) is received by the first input terminal (note bubble) of AND gate 938 and by the first input terminal of AND gate 939. LOW PEAK HIT LF (line 372) is received by the first input terminal (note bubble) of AND gate 940, by the first input terminal of AND gate 948, by the first input terminal (note bubble) of AND gate 942, and by the first input terminal of AND gate 950.

MEDIUM LOW PULSE is received by the second input terminal of AND gate 938 and by the second input terminal of AND gate 939. MEDIUM LOW PULSE depends on the output of comparator 435 (FIG. 6A) and delay elements 618, 624, and 626 (FIG. 9). MEDIUM LOW PULSE determines whether a pulse is less than or equal to sixteen (16) nanoseconds wide.

SLICER LOW is driven into the input terminal of pulse generator 966. SLICER LOW detects the leading-falling-edge of a pulse 335L. When 335L is detected, pulse generator 966 will generate a clock-wide pulse every M nanoseconds while SLICER LOW is HIGH in order to sample above the peak or below the peak of the 335L. The preferred value for M is twenty-four (24) nanoseconds. M must be a multiple of the clock rate and is implemented by using counters. Pulse generator 966 sends pulse signals to the second input terminal of AND gate 940 and the second input terminal of AND gate 948.

END OF LOW WIDE PULSE is received by the second input terminal of AND gate 942 and by the second input terminal of AND gate 950.

An OR gate 968 has a first input terminal for receiving SLICER LOW and second input terminal for receiving SLICER HIGH. OR gate 968 drives its output signal to the input terminal of a pulse measurement circuit 970. At the end of a high or low pulse, pulse measurement circuit 970 comprises a counter that holds the width of the pulse in multiples of clock.

Pulse measurement circuit 970 drives its output signal to the first input terminal of comparator 972. A preferred value "K" is driven into the second terminal of comparator 970. Typically, the value of K is 150 nanoseconds. comparator 972 drives its output to the "S" (set) terminal of an SR flip-flop 974, while delay circuit 962 drives its output signal to the "R" (reset) terminal of SR flip-flop 974. Delay circuit 962 delays the signal by 3 times "J" microseconds. The preferred value of J is 3 microseconds.

The output of SR flip-flop 374 is driven into the input terminal of a pulse generator 960 and to the "R" (reset) terminal of BLW DAC counter 953. Pulse generator 960 drives a pulse every J microseconds. The output of pulse generator 960 is received by the second terminal of AND gate 958.

The output of BLW DAC counter 953 is received by the first input terminal of comparator 956. A value "L" is received by the second terminal of comparator 956. The preferred value of L is 40 millivolts. The output of comparator 956 is received by the first terminal of AND gate 958.

OPERATION OF THE INVENTION

Before beginning adaptive equalization, adaptive equalizer system 300 (FIG. 5) undergoes a "training mode" after power-up. The training mode is split into a "peak training mode" and an "adaptive equalizer training mode." Typically, training is done on idle data which is sent to system 300 for one millisecond after power-up. After training mode terminates, system 300 initiates "adaptive equalizer mode." Adaptive equalizer mode performs peak adjustment and adaptive equalization gain on output waveform 335 continuously and is only interrupted by compensations for baseline wander.

Figure 14A:
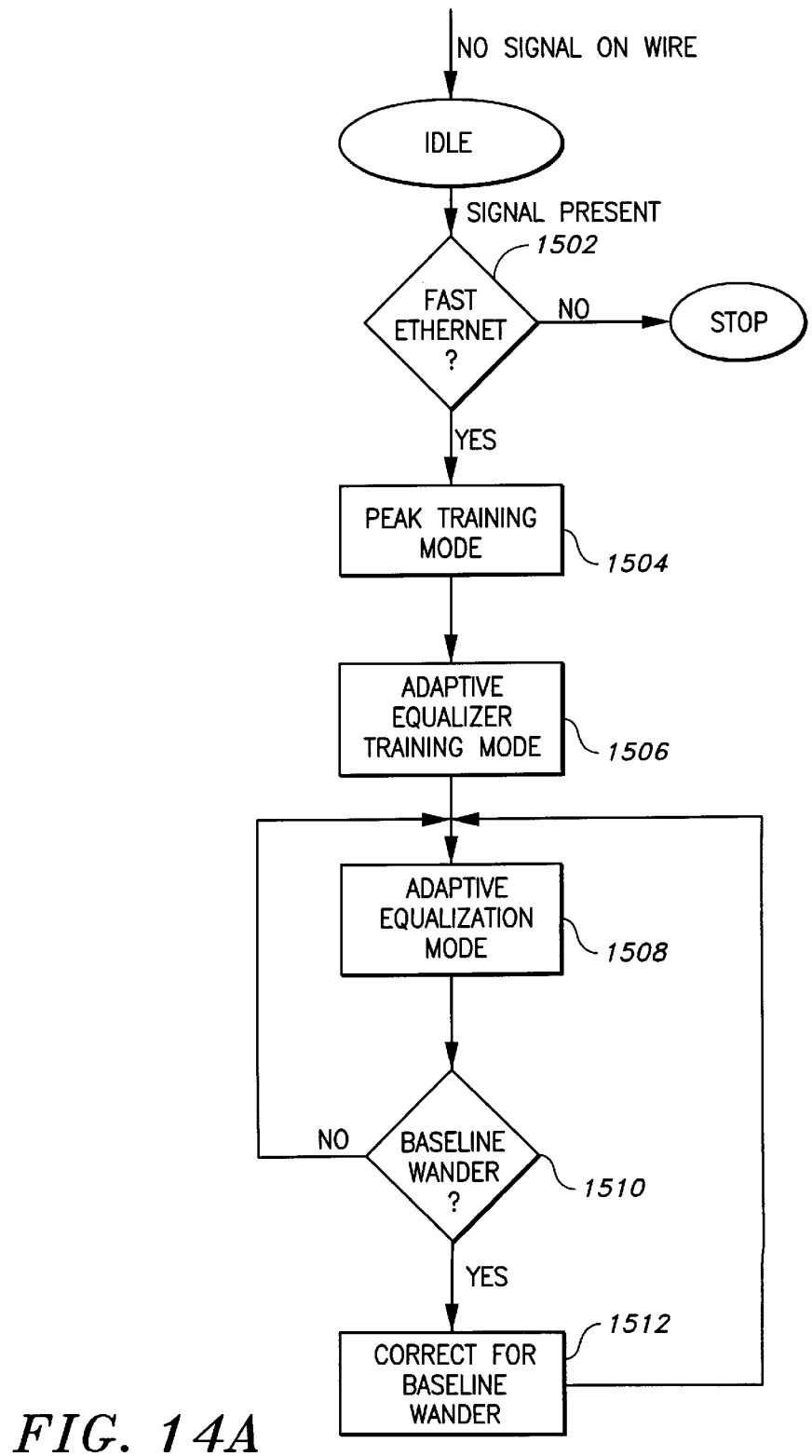
FIG. 14A is a flowchart illustrating steps in a method for how a computer implements the invention on an Ethernet LAN.

FIG. 14A is a flowchart illustrating system level steps in a method for how a computer, equipped with an Ethernet card using the ESI line interface chip, implements the invention, adaptive equalizer system 300, on an Ethernet LAN, according to a preferred embodiment of the invention. According to the ISO-OSI Reference model, the components of adaptive equalizer system 300 reside at the physical layer of the model. The ISO—OSI reference model is fully incorporated herein by reference thereto as if repeated verbatim immediately hereinafter. System 300 is idle until a signal appears on the wire. Upon detection of a signal to a workstation on an Ethernet LAN, the method begins in step 1502.

In step 1502 the ESI line interface chip determines whether Fast Ethernet (100 Mbps) is operating according to the IEEE autonegotiation standard. The autonegotiation standard is found in IEEE Standard 802.3U which is fully incorporated herein by reference thereto as if repeated verbatim immediately hereinafter. If Fast Ethernet is operating, training mode is initiated in step 1504. If Fast Ethernet is not operating, then the method waits until a Fast Ethernet signal is detected. When system 300 first detects a Fast Ethernet signal, it goes through a training period.

While data is being sent on the Ethernet, adaptive equalizer system 300 enters a training mode. It is period up to one millisecond where data is sent to a computer operating on the Ethernet LAN. Data is typically sent over a twisted pair medium through an RJ45 connection and isolation transformer before input into the ESI line interface chip. The training mode is comprised of a peak training period and an equalization training period. Both peak training mode and adaptive equalizer training mode are typically completed before 200 microseconds after signal detect.

In step 1504 adaptive equalizer system 300 enters peak training mode. During peak training mode, HIGH PEAK and LOW PEAK for the pulses of waveform 335 are calibrated. System 300 starts with both peaks furthest from common mode 1000 and equalization set at minimum. HIGH PEAK is decremented every two microseconds until it goes below the high pulses of the MLT-3 waveform, and LOW PEAK is incremented every two microseconds until it goes above the low pulses of the MLT-3 waveform. Peak training mode is done when this result is achieved. No equalization is performed while system 300 is in peak training mode.

After peak training mode terminates, system 300 performs peak adjustment continuously (including during adaptive equalizer training mode), with the exception of when system 300 is in Baseline Wander Mode. To determine the setting of HIGH PEAK and LOW PEAK after the training mode of system 300 terminates, the two peak control blocks, HIGH PEAK control 555 (FIG. 8) and LOW PEAK control 560 (FIG. 8), find the moving average low frequency peak of high and low MLT-3 pulses. This is accomplished by defining a window of six (6) pulses for each high and low pulse. Within this window, statistics are gathered, and, at the end of the window, the peak (HIGH PEAK or LOW PEAK) may be moved based on these statistics. The low frequency region of a pulse, REGION C, in the preferred embodiment is considered to start 16 ns past the beginning of the pulse and end at 32 ns past the beginning of the pulse.

To compute HIGH PEAK, for each window of X=6 pulses, the system counts how many high pulses go above the moving average high peak in REGION C. Then, based on that count, HIGH PEAK may be moved. In the preferred embodiment, if the count is less than W=1, HIGH PEAK is moved up. If the count is greater than Y=1, HIGH PEAK is moved down. Otherwise, HIGH PEAK is not changed.

To compute LOW PEAK, for each window of X=6 pulses, the system counts how many low pulses go below the moving average low peak in REGION C. Then, based on that count, LOW PEAK may be moved. In the preferred embodiment, if the count is less than W=1, LOW PEAK is moved down. If the count is greater than Y=1, LOW PEAK is moved up. Otherwise, LOW PEAK is not changed.

After peak training mode terminates, in step 1506 adaptive equalizer training mode initiates for the pulses of waveform 335. Equalizer control block 565 (FIG. 8) uses the moving average low frequency peak computed by HIGH PEAK control 555 (FIG. 8) and LOW PEAK control 560 (FIG. 8) to determine the equalization parameters sent to equalizer 310. The high frequency peak of every incoming pulse is compared to the moving average low frequency peaks computed by the two peak control blocks.

The high frequency peak of a pulse in the preferred embodiment is the peak measured in the first eight (8) nanoseconds of a pulse, defined as REGION A. If a high pulse peak in REGION A goes above the average high peak, it is referred to as high overshoot (HOVS). If a low pulse peak in REGION A goes below the average low peak, it is referred to as low overshoot (LOVS). Statistics of overshoots are gathered over a window of B=32 pulses. At the end of the window, the logic in equalizer control block 565 decides whether equalization should be changed.

In the preferred embodiment HOVS counter 865 (FIG. 12) and LOVS counter 870 (FIG. 12) keep track of high and low overshoots. At the end of the window, if the total number of overshoots (LOVS plus HOVS) is less than C=3, system 300 is underequalized, and the equalization gain is increased via equalizer DAC 410. At the end of the window, if LOVS is greater than A=4 and HOVS is greater than A=4, system 300 is overequalized, and the equalization gain is decreased. Otherwise, equalization is not changed. Typically, common mode shift can fool a conventional system into making errors in the compilation of overshoot statistics; however, the use of both LOVS and HOVS statistics by system 300 eliminates the possibility of error.

After the training mode terminates, adaptive equalizer system 300 initiates in step 1508 adaptive equalizer mode. While the data is being received by the ESI line interface chip, adaptive equalizer mode computes HIGH PEAK and LOW PEAK and adjusts equalization of waveform 335 as needed. The algorithm for processing peaks in adaptive equalizer mode is the same as that described above for adjusting peaks after peak training mode has terminated. The algorithm for processing equalization in adaptive equalizer mode is the same as described for adaptive equalizer training mode, except that the adaptive equalizer training mode algorithm increments the equalizer in steps of eight. Adaptive equalizer mode increments the equalizer in steps of one.

A decision is made in step 1510 as to whether baseline wander is occurring. If baseline wander is occurring, the method proceeds to step 1512 where the problem is compensated in baseline wander mode. In baseline wander mode, adaptive equalizer mode is frozen, i.e., peak control algorithms and equalization control algorithms are frozen. If baseline wander is not occurring, the method goes back to step 1508.

Figure 14B:
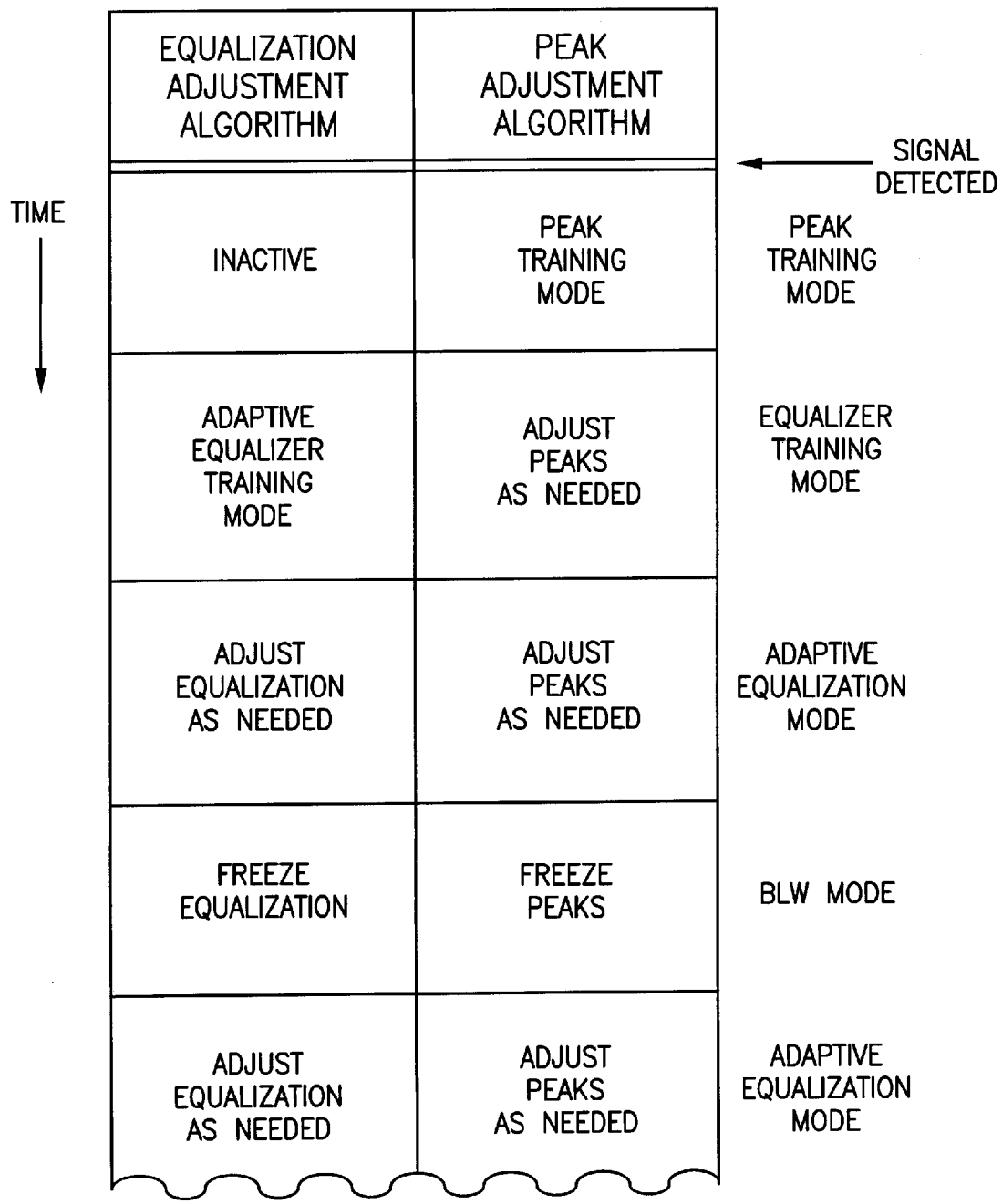
FIG. 14B is a block diagram illustrating how the invention proceeds in its operation through time.

FIG. 14B is a block diagram illustrating how the invention proceeds in its operation through time. FIG. 14B shows the same system level steps described in FIG. 14A.

Figure 15:
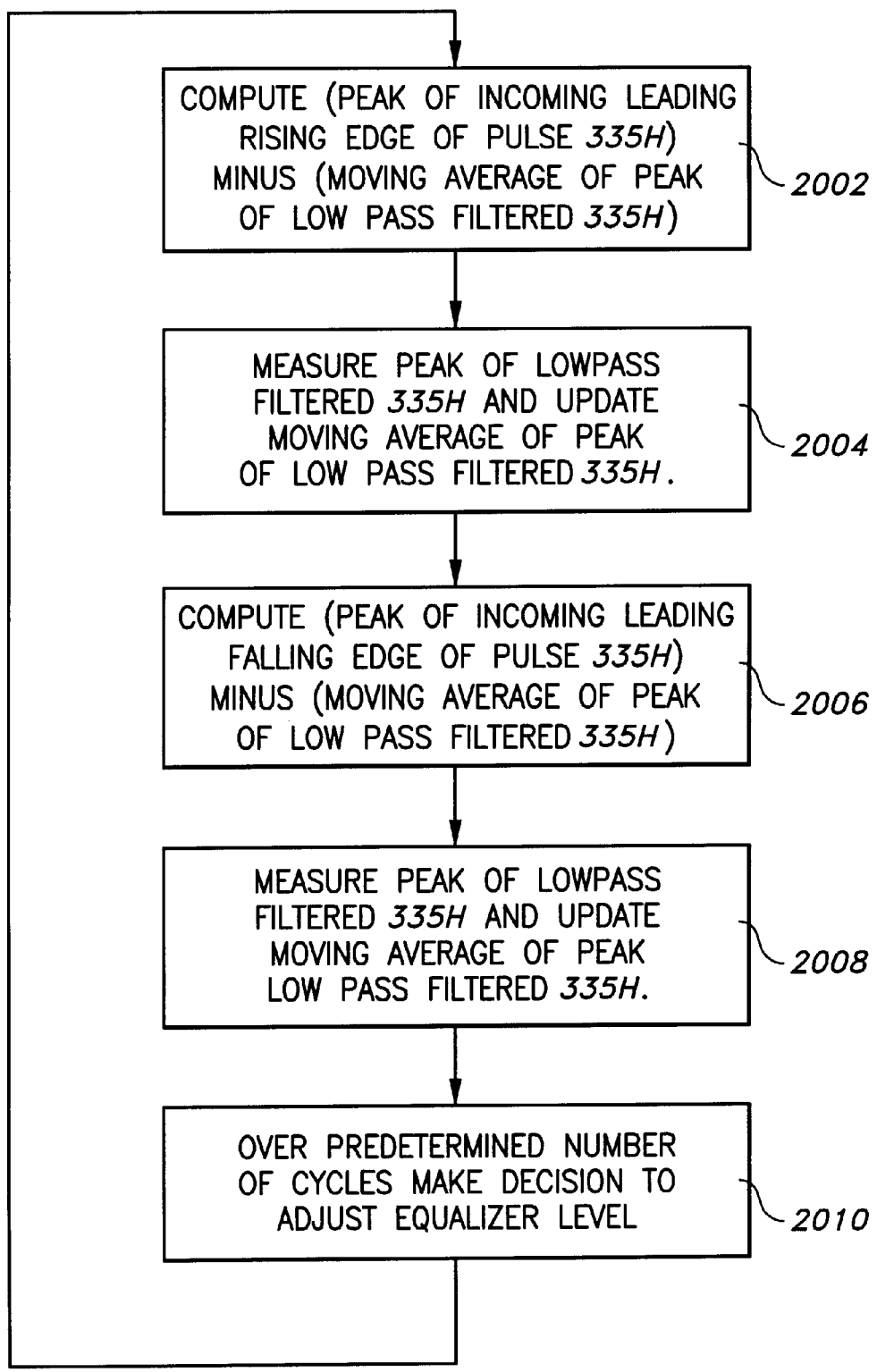
FIG. 15 is a flowchart illustrating steps in a method for implementing the adaptive equalizer mode according to a preferred embodiment.

FIG. 15 is a flowchart illustrating steps in a method for implementing the adaptive equalizer mode according to a preferred embodiment of the present invention. Adaptive equalizer mode refers to the concurrent operation of peak control after training and equalization control after training. FIG. 15 corresponds to step 1508 in FIG. 14A. In step 2002 the method begins by measuring the peak of an incoming leading-rising-edge of pulse 335H of waveform 335 (see FIG. 5) and subtracting the value from the moving average of the peak of a low-pass filtered pulse 335H. Next, in step 2004 the peak of a low-pass filtered, leading-rising-edge pulse, 335H, is measured, and the previous moving average value used in step 2002 is updated.

In step 2006 the method measures the peak of an incoming leading-falling-edge of pulse 335L of waveform 335 (see FIG. 5) and subtracts the value from the moving average of the peak of a low-pass filtered, leading-falling-edge pulse, 335L. Next, in step 2008 the peak of a low-pass filtered pulse 335L is measured and the previous moving average value used in step 2006 is updated. In step 2010, after a predetermined number of cycles, a decision is made by adaptive equalizer system 300 to adjust equalizer 310 levels. The method then goes back to step 2002 and repeats.

Further, the method for implementing an adaptive equalizer system 300 according to a preferred embodiment of the present invention can be configured using two alternative subsets of the steps in FIG. 15. In one alternative, system 300 can be implemented using sequential steps 2002, 2004, and 2010. In another alternative, system 300 can be implemented using sequential steps 2006, 2008, and 2010.

Figure 16:
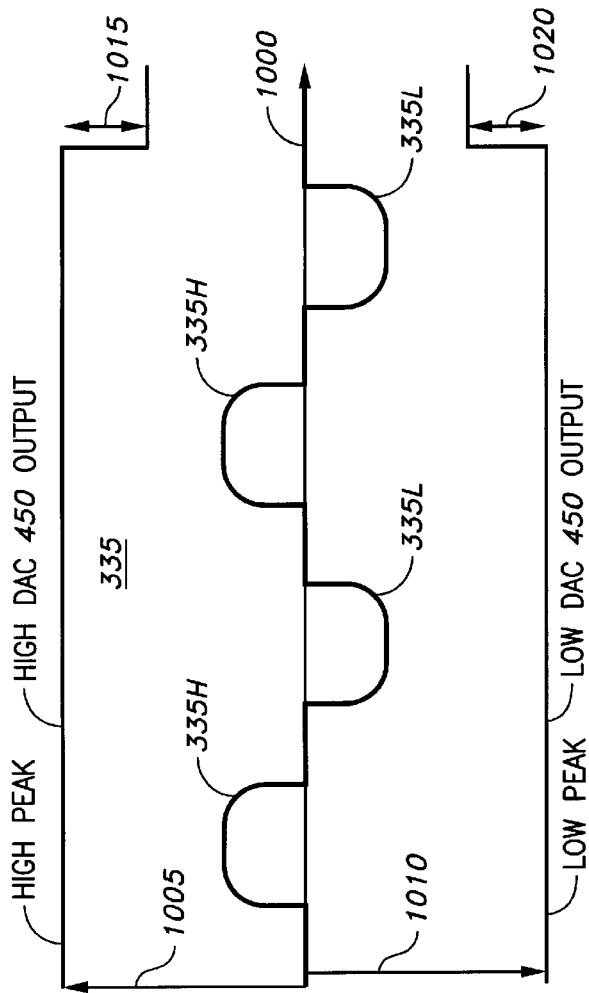
FIG. 16 shows the waveform 335 at the start of peak training mode, after initial power-up or system reset.

FIG. 16 shows the waveform 335 at the start of peak training mode. Peak training mode is initiated immediately after initial power up or system reset. High (positive) pulses 335H are data pulses above common mode level 1000, while low pulses 335L are data pulses below common mode level 1000. Since equalizer 310 is set to the lowest gain during the peak training mode, then, due to under-equalization and high frequency component loss, high pulses 335H and low pulses 335L will have rounded corners which vary in shape depending on the length of transmission line through which output waveform 335 has propagated.

During the peak training mode, HIGH PEAK DAC 450 (FIG. 6A) is initially set to its maximum value (or scale) so that it generates the HIGH PEAK signal at an offset 1005, for example, at about 700 millivolts, above common mode level 1000. However, the HIGH PEAK signal may initiate at less than 700 millivolts above common mode level 1000. HIGH PEAK DAC 450 can decrement to a minimum value so that the HIGH PEAK signal is at about 200 millivolts above common mode level 1000. Thus, the HIGH PEAK signal can track a high pulse 335H with an amplitude ranging from about 200 millivolts to about 700 millivolts above common mode level 1000.

Similarly, LOW PEAK DAC 470 (FIG. 6A) is initially set to its minimum value so that it generates the LOW PEAK signal at an offset 1010, for example, at about 700 millivolts, below common mode level 1000. However, the LOW PEAK signal may initiate at less than 700 millivolts below common mode level 1000. LOW PEAK DAC 470 can increment to a maximum value so that the LOW PEAK signal is at about 200 millivolts below common mode level 1000. Thus, LOW PEAK DAC 470 can track a low pulse 335L with an amplitude ranging from about 700 millivolts to about 200 millivolts below common mode level 1000.

Since there is a 500 millivolts difference between the maximum and minimum DAC values for each of HIGH PEAK DAC 450 and LOW PEAK DAC 470, seven-bit DACs may be used to track output waveform 335 without sacrificing DAC resolution. Additionally, by initially setting the HIGH PEAK signal at preferably about 700 millivolts above common mode level 1000 and by setting the LOW PEAK signal at preferably about 700 millivolts below common mode level 1000, complexity in the digital logic design of the invention is reduced.

Upon power up, once signal is detected, every two micro-seconds, HIGH DAC counter 655 (FIG. 10) decrements by eight DAC values the HIGH PEAK DAC 450 output so that the HIGH PEAK voltage level decreases in the direction of arrow 1015 towards common mode level 1000. Similarly, every two micro-seconds LOW DAC Counter 755 (FIG. 11) increments by eight DAC values the LOW PEAK DAC 470 output so that the LOW PEAK voltage level increases in the direction of arrow 1020 towards common mode level 1000. A timer (not shown) sets the programmable two micro-second time period when decreasing the HIGH PEAK voltage level and increasing the LOW PEAK voltage level.

Figure 17:
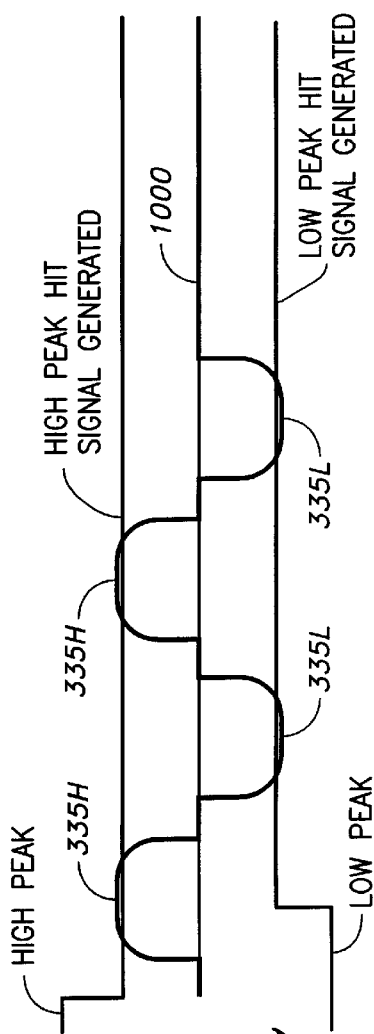
FIG. 17 shows the waveform 335 at the time peak training mode terminates.

FIG. 17 shows the waveform 335 at the time peak training mode terminates. FIG. 17 shows that the HIGH PEAK voltage level has decreased sufficiently to cross (or hit) a high pulse 335H. Similarly, the LOW PEAK voltage level has increased sufficiently to cross (or hit) a low pulse 335L. When a high pulse 335H crosses the HIGH PEAK signal, compound comparator 425 (FIG. 6A) outputs the HIGH PEAK HIT LF and HIGH PEAK HIT HF signals for feedback to Digital logic control stage 405. When a low pulse 335L crosses the LOW PEAK signal, compound comparator 440 (FIG. 6A) outputs the LOW PEAK HIT LF and LOW PEAK HIT HF signals for feedback to digital logic control stage 405.

Comparator 675 (FIG. 10) drives the HIGH PEAK HIT signal to reset SR flip-flop 650 (FIG. 10), thereby terminating the HIGH PEAK TRAINING MODE signal. Comparator 775 (FIG. 11) drives the LOW PEAK HIT signal to SR flip-flop 750 (FIG. 11), thereby terminating the LOW PEAK TRAINING signal. Thus, OR gate 580 (FIG. 8) terminates the PEAK TRAINING MODE signal being driven to equalizer control block 565, thereby ending the peak training mode.

Additionally, when the peak training mode ends, HIGH PEAK DAC 450, which was previously decrementing by steps of eight DAC values, begins incrementing or decrementing by steps of one DAC value as the HIGH PEAK signal follows high pulses 335H. Similarly, LOW PEAK DAC 470, which was previously incrementing at steps of eight DAC values, will now increment or decrement at steps of one DAC value as the LOW PEAK signal follows low pulses 335L.

Once the peak training mode terminates, adaptive equalizer system 300 undergoes a "settling period" before initiating the adaptive equalizer training mode. During the settling period, equalizer 310 (FIG. 5) stays at lowest equalization value until 100 MLT-3 pulse cycles (programmable value) of output waveform 335 have propagated. The settling period permits HIGH PEAK DAC 450 and LOW PEAK DAC 470 to settle, since both DACs were previously changing at eight DAC values per two microseconds during the peak training mode. After 100 pulse cycles of output waveform 335 (see FIG. 5) have propagated, the adaptive equalizer training mode initiates.

FIG. 18 is used to illustrate a method of adjusting the peaks of high pulses 335H and low pulses 335L, after peak training mode has completed training, according to a preferred embodiment of the invention. Referring to FIG. 18, it shows the equalized output waveform 335, the four reference outputs of AAU 495 (FIG. 6A) (i.e., HIGHPEAK, LOWPEAK, SLICER HIGH, SLICER LOW), and the common mode voltage 1000 of the equalized output waveform.

At the beginning of the adaptive equalizer training mode, equalizer 310 activates and trains until it overequalizes output waveform 335 so that an overshoot 1100 appears at the rising edge of a high pulse 335H, and an overshoot 1105 appears at the falling edge of a low pulse 335L. When output waveform 335 is sufficiently overequalized, overshoot 1100 is about 20 millivolts (preferred value) above the voltage level of low frequency region peak 335HP of high pulse 335H, and overshoot 1105 is about 20 millivolts (preferred value) below the voltage level of low frequency region peak 335LP of low pulse 335L.

As stated above, the SLICER HIGH signal is set, preferably, at a voltage level equal to equations 7A and 7B.

$$V_{HIGH\ SLICE} = \frac{3}{4}(V_{HIGH\ PEAK}) + \frac{1}{4}(V_{LOW\ PEAK}) \quad (7A)$$

$$V_{HIGH\ SLICE} = V_{HIGH\ PEAK} - \frac{1}{4}(V_{HIGH\ PEAK-VLOW\ PEAK}) \quad (7B)$$

Similarly, as stated above, the SLICER LOW signal is set, preferably, at a voltage level equal to equations 8A and 8B.

$$V_{LOW\ SLICE} = \frac{3}{4}(V_{LOW\ PEAK}) + \frac{1}{4}(V_{HIGH\ PEAK}) \quad (8A)$$

$$V_{LOW\ SLICE} = V_{LOW\ PEAK} + \frac{1}{4}(V_{HIGH\ PEAK} - V_{LOW\ PEAK}) \quad (8B)$$

The SLICER HIGH and SLICER LOW signals, along with the delay elements in synchronizer/region definer 550 (see FIG. 9), define REGION A, REGION B, and REGION C in high and low pulses 335H and 335L (see FIG. 18). compound comparator 425 (FIG. 6A) detects a high pulse 335H crossing HIGH PEAK in REGION A or in REGION C. compound comparator 440 (FIG. 6A) detects a low pulse 335L crossing LOW PEAK in REGION A or in REGION C. HIGH PEAK HIT LF 364 and LOW PEAK HIT LF 372 are used for REGION C and beyond.

REGION A, REGION B and REGION C are defined as three regions of a pulse 335H or 335L. The pulse regions are set to the values shown in the synchronizer/region definer 550 (FIG. 9) in the preferred embodiment. REGION A is defined as the first eight (8) nanoseconds of a pulse. REGION B is defined as the eight (8) nanoseconds after REGION A. REGION C is defined as the sixteen (16) nanoseconds after REGION B. Thus, in one example, a high pulse 335H (or low pulse 335L) with an eight (8) nanosecond pulse width will only contain REGION A. Using another example, a high pulse 335H (or low pulse 335L) with a twenty-four (24) nanosecond pulse width will have an eight (8) nanosecond REGION A, an eight (8) nanosecond REGION B, and an eight nanosecond REGION C (i.e., rather than a sixteen nanosecond REGION C).

Sampling the first eight (8) nanoseconds (i.e., the REGION A portion) of a high pulse 335H of waveform 335 (see FIG. 5) or of a low pulse 335L is difficult to perform accurately, even with use of a high-speed clock (e.g., one Gigahertz). . Sampling techniques fail because of frequency and phase differences between a clock and the pulses of waveform 335. Also, sampling using the local clock of adaptive equalizer system 300 is not useful because the local clock is asynchronous to incoming pulses from waveform 320.

Rather than using a clock, delay elements are used by synchronizer/region definer 550 to solve the timing problems associated with trying to sample waveform 335. To assure that the proper regions of a pulse are sampled, REGION A, REGION B, and REGION C are referenced to the tripping of mid-level comparators 430 and 435, i.e., the rising edge of SLICER HIGH or SLICER LOW.

Changes in air temperature, voltage levels, and process parameters will cause delay elements to vary their delay parameters. Delay line calibration circuit 380 (FIG. 7) assures that the delay elements in synchronizer/region definer 550 are set at a predetermined delay by sending DELAY LINE BIAS over line 382 to each delay element. The delay elements in Synchronizer/region definer 550 (602, 604, 606, 608, 609, 618, 624, 626, 628, and 629) are calibrated by circuit 380 to compensate for environmental changes (e.g., temperature) or voltage changes to assure that the preferred delay is produced.

According to the invention, the SLICER HIGH input signal to Synchronizer/region definer 550 (FIG. 9) indicates the rising edge of high pulse 335H. Delay element 602 defines REGION A as the first eight (8) nanoseconds of high pulse 335H, which sends a digital HIGH to one input terminal of AND gate 612. HIGH PEAK HIT HF is sent to a second input terminal of AND gate 612 over line 362. When both input terminals of AND gate 612 are HIGH, AND gate 612 sends to HOVS counter 865 a digital HIGH. High peak overshoot (HOVS) only occurs in REGION A. Similarly, delay element 618 defines REGION A of low pulse 335L using SLICER LOW and LOW PEAK HIT HF. The first eight nanoseconds of 335H is done to within ten percent accuracy by delay line calibration circuit 380 without the use of a clock.

Delay elements 604 and 606 define REGION B of high pulse 335H. REGION B is defined as the region between eight (8) nanoseconds and sixteen (16) nanoseconds, in the preferred embodiment. The existance of a high pulse 335H with REGION B qualifies by determining that 335H is at least 12 ns wide, as defined by delay elements 604 and 606. Similarly, delay elements 624 and 626 define REGION B of a low pulse 335L.

Delay elements 602, 604, 606, and 609 define REGION C of high pulse 335H. REGION C is defined as the region after sixteen (16) nanoseconds from the start of the pulse, in the preferred embodiment. The existance of a high pulse 335H with REGION C qualifies by determining that such 335H is at least 19 ns wide, as defined by delay elements 602, 604, 606, and 609. Similarly, delay elements 618, 624, 626, and 629 define REGION C of a low pulse 335L.

During the adaptive equalizer training mode, the HIGH PEAK signal (i.e., $V_{HIGH\ PEAK}$) continues to follow the average peak 335HP of a high pulse 335H. Thus, the HIGH PEAK DAC 450 value is within one least significant bit (LSB) of the average peak 335HP value. High pulse counter 660 (FIG. 10) uses the signal HIGH PULSE WITH REGION C to increment for every propagating high pulse 335H with REGION C. Comparator 670 (FIG. 10) determines when six (preferred value X=6) high pulses 335H with REGION C have propagated by comparing the high pulse counter 660 value with its input signal X, where X=6.

For each of the six high pulses 335H with REGION C, if any of these six pulses register a HIGH PEAK HIT LF, then AND gate 600 (FIG. 9) outputs the HIGH PEAK HIT (REGION C) signal to increment high peak hit counter 665 (FIG. 10). comparator 675 (FIG. 10) determines if the HIGH PEAK HIT (REGION C) signal occurs more than once (i.e., Y=1 is the preferred value). Similarly, Comparator 685 (FIG. 10) determines if the HIGH PEAK HIT (REGION C) signal occurs less than once (i.e., W=1 is the preferred value). The variables Y and W may also be set to other values.

If the HIGH PEAK HIT (REGION C) signal occurs more than once (i.e., for Y=1) in the last six high pulses with REGION C, OR gate 680 (FIG. 10) increments High DAC counter 655 (FIG. 10) by one DAC value. This increases the HIGH PEAK DAC 450 output value and moves the HIGH PEAK signal in the direction of arrow 1130 (FIG. 18). If the HIGH PEAK HIT (REGION C) signal does not occur (i.e., occurred less than W=1) in the last six high pulses with REGION C, OR gate 710 decrements High DAC counter 655 by one DAC value. This decreases the HIGH PEAK DAC 450 output value and moves the HIGH PEAK signal in the direction of arrow 1135 (FIG. 18). If the conditions above do not occur, the output of High DAC counter 655 does not change.

Similarly, during the adaptive equalizer training mode, the LOW PEAK signal (i.e., $V_{LOW\ PEAK}$) continues to follow the average peak 335LP of a low pulse 335L. Thus, the LOW PEAK DAC 470 value is within one least significant bit (LSB) of the average peak 335LP value. Low pulse counter 760 (FIG. 11) uses the signal LOW PULSE WITH REGION C to increment for every propagating low pulse 335L with REGION C. Comparator 770 (FIG. 11) determines when six (preferred value X=6) low pulses 335L with REGION C have propagated by comparing the low pulse counter 760 value with its input signal X, where X=6.

For each of the six low pulses 335L with REGION C, if any of these six pulses register a LOW PEAK HIT LF, then AND gate 622 (FIG. 9) outputs the LOW PEAK HIT (REGION C) signal to increment low peak hit counter 765 (FIG. 11). comparator 775 (FIG. 11) determines if the LOW PEAK HIT (REGION C) signal occurs more than once (i.e., Y=1 is the preferred value). Similarly, comparator 785 (FIG. 11) determines if the LOW PEAK HIT (REGION C) signal occurs less than once (i.e., W=1 is the preferred value). The variables Y and W may also be set to other values.

If the LOW PEAK HIT (REGION C) signal occurs more than once (i.e., for Y=1) in the last six low pulses with REGION C, OR gate 780 (FIG. 10) decrements Low DAC counter 755 (FIG. 11) by one DAC value. This decreases the LOW PEAK DAC 470 output value and moves the LOW PEAK signal in the direction of arrow 1150 (FIG. 18). If the LOW PEAK HIT (REGION C) signal does not occur (i.e., occurred less than W=1) in the last six low pulses with REGION C, OR gate 805 increments Low DAC Counter 755 by one DAC value. This increases the LOW PEAK DAC 470 output value and moves the LOW PEAK signal in the direction of arrow 1155 (FIG. 18). If the conditions above do not occur, the output of Low DAC counter 755 does not change.

Thus, according to the invention, the HIGH PEAK signal decrements, increments or does not change levels after every six propagating high pulses 335H with REGION C. Similarly, the LOW PEAK signal increments, decrements or does not change levels after every six propagating low pulses 335L with REGION C. The invention, therefore, avoids the problem encountered by conventional adaptive equalizers where a sparse-data patterned waveform 205 (FIG. 4) causes the peak detector'internal high peak signal 200 to overly decrement when data pulses are absent.

For every six (X=6) high pulses 335H with REGION C, the comparator 670 output signal resets high pulse counter 660 and high peak hit counter 665. High pulse counter 660 will then again count the next six (X=6) propagating high pulses 335H with REGION C, and high peak hit counter 665 restarts the count of pulses registering HIGH PEAK HIT WITH REGION C.

Similarly, for every six low pulses 335L with REGION C, the comparator 770 output signal resets low pulse counter 760 and low peak hit counter 765. Low pulse counter 760 will then again count the next six propagating low pulses 335L with REGION C, while low peak hit counter 765 restarts the count of pulses registering LOW PEAK HIT WITH REGION C.

Figure 19:
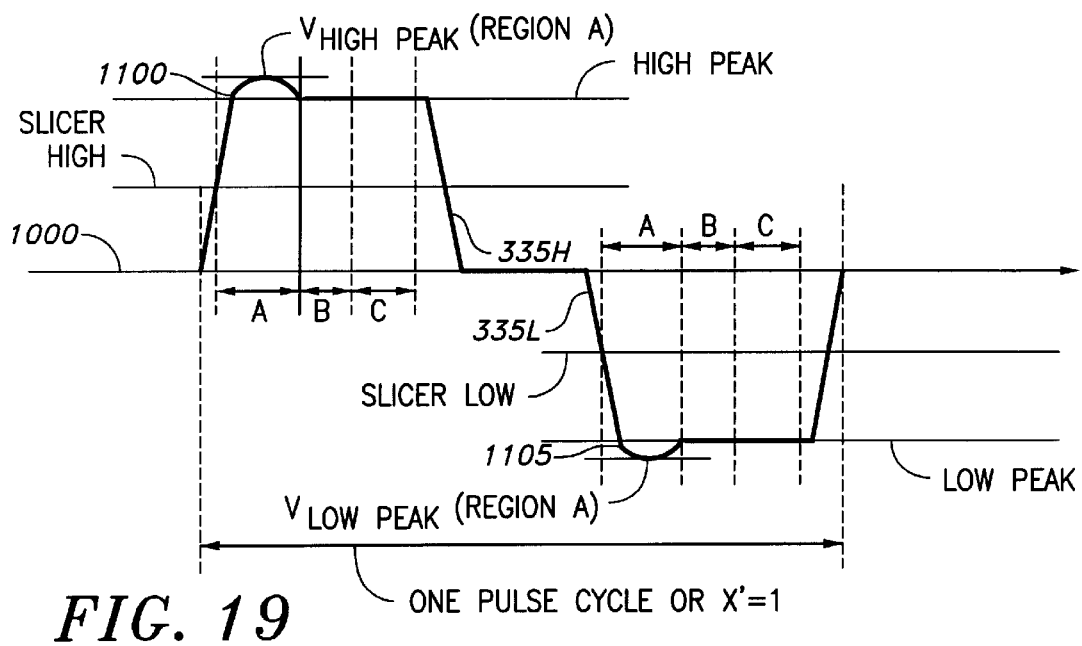
FIG. 19 is used to illustrate a method of determining adjustments in the equalization of high pulses 335H and of low pulses 335L.

FIG. 19 is used to illustrate a method of determining adjustments in the equalization of high pulses 335H and of low pulses 335L, according to a preferred embodiment of the invention. The invention uses peak statistics to equalize waveform 335. For each leading data pulse edge 335H and 335L, the invention compares the peak of the data edge in the first eight (8) nanoseconds to a reference level which is equal to the average low frequency voltage peaks. The first eight nanoseconds of a pulse is REGION A and is the high frequency region of a pulse.

High frequency leading edge peaks will form a distribution relative to the average low frequency peak. Proper equalization is defined as being achieved when, for an empirically predetermined number of data pulses (i.e., B=32), a approximately ten percent percentage (i.e., C=3) of the peaks of the leading rising or falling pulse edges will be some number of millivolts (i.e., 20 millivolts) above the average low frequency peak voltage level.

A problem arises in trying to determine when the peak of a particular data edge is 20 millivolts above the average peak. It is not practical to shift the data by 20 millivolts. Therefore, the invention shifts the reference level of compound comparator 425 and 440 (FIG. 6A) up by 20 millivolts in the first eight (8) nanoseconds of the waveform. In effect the overshoot function is used to define the boundary of the distribution of high frequency peaks for a window of data pulses.

Since the voltage of the outlying members of the peak distribution is known and well controlled by the equalization algorithm, the invention is assured that all other members of the peak distribution (i.e., 29 of 32) will fall in a peak voltage range between low frequency peak plus 20 millivolts and low frequency peak minus some millivolts. By setting the value of the overshoot, the invention statistically moves the waveform from a relative underequalized to overequalized state.

Referring to FIG. 19, it shows one MLT-3 pulse cycle (i.e., B =1 shown) of output waveform 335. Pulse cycle counter 860 (FIG. 12) will increment for every MLT-3 pulse cycle propagation of output waveform 335. Comparator 875 (FIG. 12) determines when thirty-two (preferred value B=32) pulse cycles have propagated by comparing the pulse cycle counter 860 value with its input signal B=32.

Analog summing node 442 (FIG. 6A) will add the $I_{HIGH\ PEAK\ OFFSET}$ current to the $I_{HIGH\ PEAK}$ current to generate, in REGION A of a high pulse 335H, a HIGH-PEAK(REGION A) signal. HIGH-PEAK(REGION A) is shown in equation 6 as $V_{HIGH\ PEAK(REG.\ A)}$ A voltage of 20 millivolts (preferred value) is the reduction in the voltage potential across R1; i.e., $R1(I_{HIGH\ PEAK\ OFFSET})$ $$V_{HIGH\ PEAK(REG.\ A)} = V_{DD} - R1(I_{HIGH\ PEAK}) + R1(I_{HIGH\ PEAK\ OFFSET}) \quad (6)$$

Similarly, analog summing node 448 will subtract the $I_{LOW\ PEAK\ OFFSET}$ current from the $I_{LOW\ PEAK}$ current to generate, in REGION A of a low pulse 335L, a LOW-PEAK(REGION A) signal. LOW-PEAK (REGION A) is shown in equation 10 as $V_{LOW\ PEAK(REG.\ A)}$. A voltage of 20 millivolts (preferred value) is the additional potential voltage drop across R1; i.e., $R1(I_{LOW\ PEAK\ OFFSET})$.

$$V_{LOWPEAK(REG.\ A)} = V_{DD} - R1(I_{LOWPEAK}) - R1(I_{LOW\ PEAK\ OFFSET}) \quad (10)$$

For every thirty-two MLT-3 pulse cycles (i.e., preferred B=32) of output waveform 335, the invention determines when an overshoot 1100 crosses the HIGH-PEAK(REGION A) signal and when an overshoot 1105 crosses the LOW-PEAK(REGION A) signal. Thus, in REGION A of a high pulse 335H, compound comparator 425 (FIG. 6A) compares an overshoot 1100 voltage value to the HIGH-PEAK (REGION A) voltage value. If an overshoot 1100 crosses the HIGH-PEAK(REGION A) signal, then AND gate 612 (FIG. 9) outputs the HOVS signal to increment HOVS counter 865 (FIG. 12).

Similarly, in REGION A of a low pulse 335L, compound comparator 440 (FIG. 6A) compares an overshoot voltage 1105 voltage value to the voltage value of the LOW-PEAK (REGION A) signal. If an overshoot 1105 crosses the LOW-PEAK(REGION A) signal, then AND gate 616 (FIG. 9) outputs the LOVS signal to increment LOVS counter 870 (FIG. 12).

For every thirty-two programmable pulse cycles (i.e., preferred B=32) of output waveform 335, the invention determines whether the overshoot 1100/HIGH-PEAK (REGION A) signal crossings and an overshoot 1105/LOW-PEAK(REGION A) signal crossings sum is less than three occurrences (programmable value C). Adder 890 (FIG. 12) sums the output of HOVS counter 865 and LOVS counter 870. Comparator 895 will then compare the adder 890 output value with its C=3 input signal to determine if the HOVS counter 865 output and LOVS counter 870 output sum is less than three. Similarly, comparators 880 and 885 see that LOVS and HOVS are each greater than A=4. The method of operation of the invention depends on the conditions described below.

Condition 1: System 300 is Underequalized HOVS+ LOVS<C (adaptive equalizer training mode is active)

If the overshoot 1100/HIGH-PEAK(REGION A) signal crossings and overshoot 1105/LOW-PEAK(REGION A) signal crossings sum is less than C=3 and the invention is in the adaptive equalizer training mode, then the AND gate 910 (FIG. 12) output will increment equalizer DAC counter 905 to increase the equalizer DAC 410 output by eight DAC values, thereby increasing the voltage level of overshoot 1100 and increasing the negative voltage level of overshoot 1105. The invention will then reset pulse cycle counter 860, HOVS counter 865 and LOVS counter 870. Pulse cycle counter 860 will then again count the next thirty-two (32) pulse cycles of output waveform 335. For each thirty-two (32) pulse cycles, HOVS counter 865 and LOVS counter 870 will again count the occurrences of overshoot 1100/ HIGH-PEAK(REGION A) signal crossings and overshoot 1105/LOW-PEAK(REGION A) signal crossings, respectively, to permit the invention to properly equalize output waveform 335.

Condition 2: System 300 is Underequalized HOVS+ LOVS<C (adaptive equalizer training mode has terminated)

If the overshoot 1100/HIGH-PEAK(REGION A) and overshoot 1105/LOW-PEAK(REGION A) signal crossings sum is less than C=3 and if the invention is no longer in the adaptive equalizer training mode, then the AND gate 814 (FIG. 12) output will increment equalizer DAC counter 905 to increase equalizer DAC 410 output by one DAC value to increase equalization of output waveform 335. The invention will then reset pulse cycle counter 860, HOVS counter 865 and LOVS counter 870, and again determine the proper equalization based on the next thirty-two pulse cycles (i.e., preferred B=32).

Condition 3: HOVS or LOVS is greater than A and DC shift in common mode level 1000 occurs p If at the end of the window of thirty-two pulse cycles (preferred B=32), either HOVS or LOVS is greater than A=4, but both are not greater than A=4, this indicates that there may be a problem with common mode level 1000. Equalizer 310 will not change equalization value until the peak algorithm has corrected the peaks for common mode, or common mode 1000 goes back to normal, as indicated by HOVS and LOVS tracking more closely.

Condition 4: System 300 is Overequalized HOVS is greater than A, and LOVS is greater than A, and DC shift in common mode level 1000 does not occur, and adaptive equalizer training mode is active If the overshoot 1100/HIGH-PEAK(REGION A) signal crossings total is greater than A=4, and if the overshoot 1105/LOW-PEAK(REGION A) signal crossings total is greater than A=4, then output waveform 335 is overequalized, and the next step of the invention depends on whether the adaptive equalizer training mode is still active. If the invention is in the adaptive equalizer training mode, then the adaptive equalizer training mode terminates, and the comparator 875 (FIG. 12) output signal through OR gate 810 then resets pulse cycle counter 860, HOVS counter 865 and LOVS counter 870. The invention will again count the overshoot 1100/HIGH-PEAK(REGION A) and overshoot 1105/LOW-PEAK(REGION A) signal crossings sum for thirty-two (32) pulse cycles to determine the proper equalization for output waveform 335. See condition 5 (below) for the scenario where the adaptive equalizer training mode is inactive.

Condition 5: System 300 is Overequalized HOVS is greater than A, and LOVS is greater than A, and DC shift in common mode level 1000 does not occur, and adaptive equalizer training mode has terminated If the overshoot 1100/HIGH-PEAK(REGION A) signal crossings total is greater than A=4, and if the overshoot 1105/LOW-PEAK(REGION A) signal crossings total is greater than A=4 and the adaptive equalizer training mode has terminated, then the AND gate 812 output signal decrements equalizer DAC counter 905 (FIG. 12) so that the equalizer DAC 410 output decreases by one DAC value for proper equalization of waveform 335. The invention then resets pulse cycle counter 860, HOVS counter 865 and LOVS counter 870. The invention will again count the overshoot 1100/HIGH-PEAK(REGION A) and overshoot 1105/LOW-PEAK(REGION A) signal crossings sum for the next thirty-two (32) pulse cycles to determine the proper equalization for output waveform 335.

If the conditions above for thirty-two (32) pulse cycles do not occur, then the output waveform 335 is properly equalized and the equalizer DAC 410 output value is not incremented or decremented.

The invention may optionally ignore measuring overshoots 1100 when the HIGH PEAK signal is below peak 335HP in REGION C of a high pulse 335H. Similarly, the invention may optionally ignore measuring overshoots 1105 when the LOW PEAK signal is above peak 335LP in REGION C of a low pulse 335L. As another option, when performing the above-mentioned steps to determine equalization, the invention may use only pulses with REGION C.

According to a preferred embodiment of the invention as shown in FIG. 6A, compound comparator 425 has two outputs: HIGH PEAK HIT HF and HIGH PEAK HIT LF. HIGH PEAK HIT HF goes HIGH when a high pulse 335H crosses HIGH PEAK in REGION A. HIGH PEAK HIT LF goes HIGH when low pulse 335L crosses HIGH PEAK in REGION C and beyond. Similarly, compound comparator 440 does the equivalent for a low pulse 335L.

Comparator 430 detects when a high pulse 335H crosses SLICER HIGH. Similarly, comparator 435 detects when a low pulse 335L crosses SLICER LOW. After training is completed, the function of comparators 430 and 435 are to define the beginning and end of each pulse by output signals SLICER HIGH and SLICER LOW. Comparators 430 and 435 also output the binary data lines 366 and 368 of system 300, which are used by the clock recovery module (not shown) in the ESI line interface chip. In a less preferred embodiment of the invention, additional comparators may be used for separately detecting crossings in REGION A and in REGION C. However, offset problems may occur in CMOS embodiments.

Figure 20:
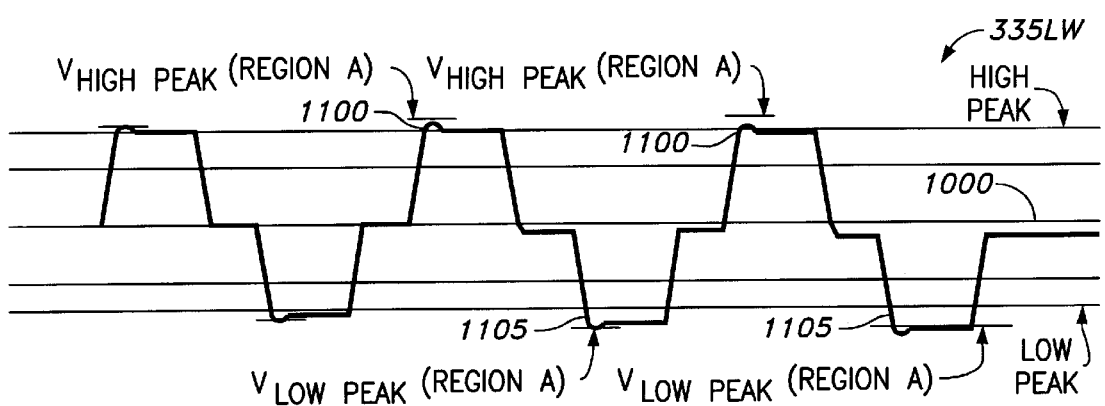
FIG. 20 is a data waveform which shifts downward from the common mode level due to "wobble;"
Figure 21:
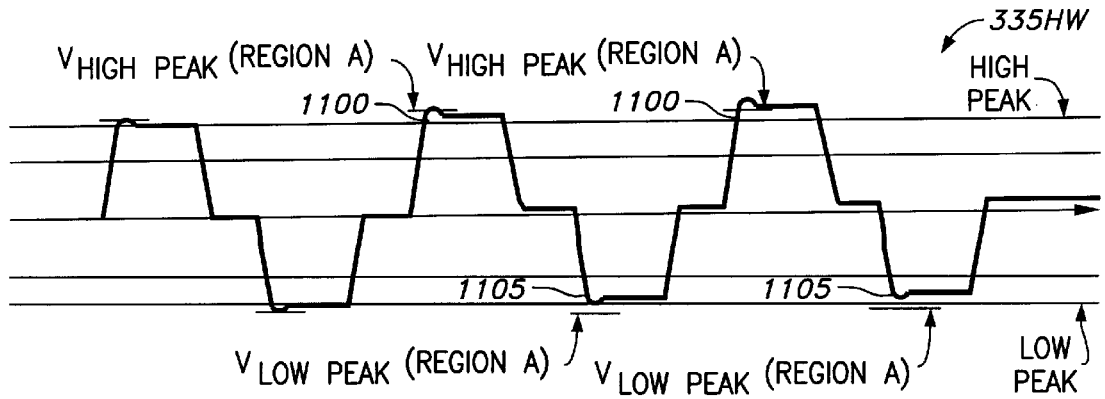
FIG. 21 is a data waveform which shifts upward from the common mode level due to wobble.

FIG. 20 shows an output waveform 335LW shifting downward from common mode level 1000 as a result of wobble, while FIG. 21 conversely shows an output waveform 335HW shifting upward from common mode level 1000 due to wobble. When a waveform 335 with a relative scarcity of transitions is propagating, the high-pass filter characteristics of a cabling system'transformer will cause wobble. As a result of the wobble in FIG. 20, overshoots 1105 will begin crossing the LOW-PEAK(REGION A) signal, while overshoots 1100 no longer cross the HIGH-PEAK(REGION A) signal.

FIG. 21 shows how wobble causes overshoots 1100 to begin crossing the HIGH-PEAK(REGION A) signal, while overshoots 1105 no longer cross the LOW-PEAK(REGION A) signal. Since the invention detects both overshoots, i.e., 1100/HIGH-PEAK(REGION A) crossings, and overshoots, i.e., 1105/LOW-PEAK(REGION A) crossings, before increasing or decreasing equalization, waveforms 335LW and 335HW will not be inaccurately detected as overequalized waveforms.

Figure 22:
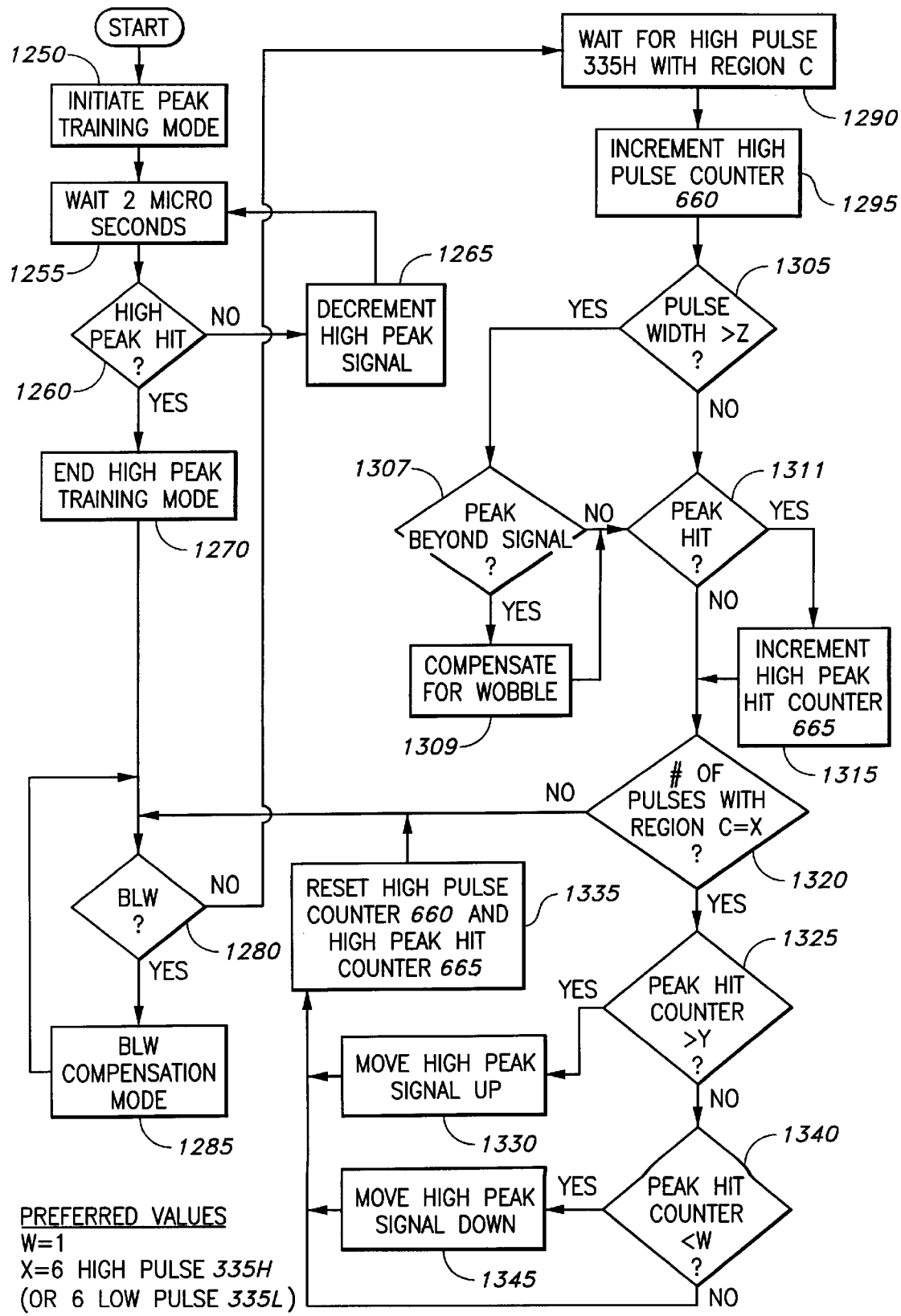
FIG. 22 is a flowchart illustrating steps in a method for implementing the peak training mode and for implementing peak adjustment after training, for high (positive) pulses of the output waveform of the invention according to a preferred embodiment.
Figure 23:
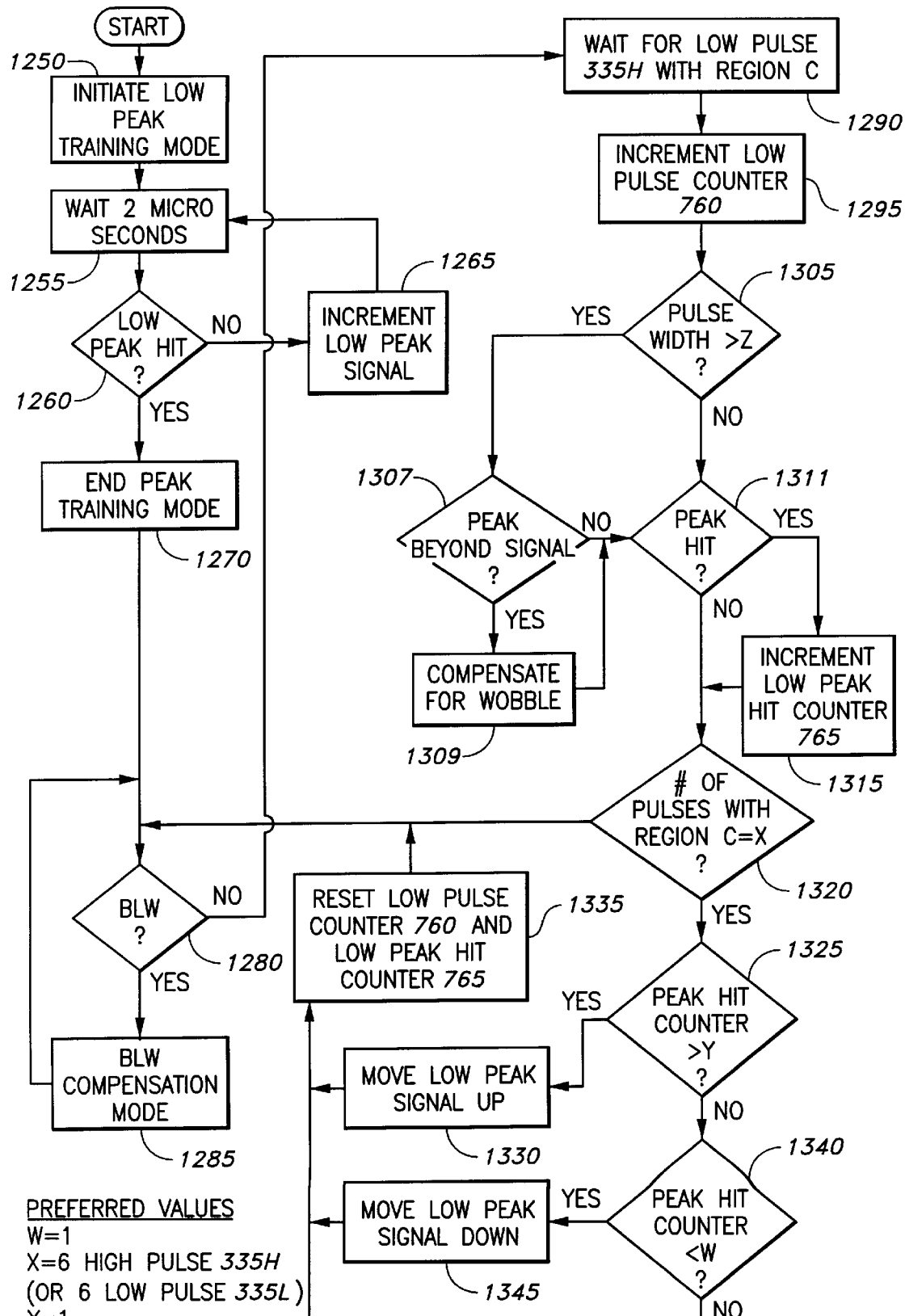
FIG. 23 is a flowchart illustrating steps in a method for implementing the peak training mode and for implementing peak adjustment after training, for low pulses of the output waveform of the invention according to a preferred embodiment.

FIG. 22 is a flowchart illustrating steps in a method for implementing peak adjustments when following high pulses 335H, i.e., setting the signal HIGH PEAK, according to a preferred embodiment. FIG. 23 corresponds to how the invention implements peak adjustment from step 1504 through step 1512 in FIG. 14A.

Referring to FIG. 22, in step 1250 the invention initiates the peak training mode. The system reset signal is driven into SR flip-flop 650 (FIG. 10) to initiate the HIGH PEAK TRAINING MODE signal (and into SR flip-flop 750 to initiate the LOW PEAK TRAINING MODE signal).

In step 1255 the HIGH PEAK signal waits for two microseconds while high pulses 335H propagate. In step 1260 the invention determines if a high pulse 335H crosses (or hits) the HIGH PEAK signal during the two microsecond wait time. If not, then in step 1265 the HIGH PEAK signal is decremented towards output waveform 335. From step 1265 the invention returns to step 1255 during which the HIGH PEAK signal waits for two microseconds while high pulses 335H propagate. If in step 1260 a high pulse 335H crosses HIGH PEAK signal, or a low pulse 335L crosses the LOW PEAK signal, then in step 1270 the corresponding peak training mode ends.

An occurrence of baseline wander in output waveform 335 may be sensed in step 1280 (actual detection done by BLW control block 570). If baseline wander is detected, then in step 1285 peak adjustment is suspended while the BLW algorithm operates. In step 1290 the invention tests and waits for a propagating high pulse 335H with REGION C, and upon detection in step 1295, increments HIGH PULSE counter 660 (FIG. 10). In step 1305 if a high pulse 335H has a width longer than eight (8) bit times (preferred value Z=8), then the method proceeds to step 1307. In step 1307 a decision is made whether the signal 335H crosses HIGH PEAK or whether the signal 335L crosses LOW PEAK. If the signal 335H or 335L crosses HIGH PEAK or LOW PEAK respectively, then the invention may compensate for detected wobble in step 1309. By definition, baseline wander is an exaggerated case of wobble. Wobble is measured on a scale of tens of millivolts, whereas baseline wander is measured on a scale of hundreds of millivolts.

Beginning with step 1311, the HIGH PEAK signal tracks high pulses 335H by detecting when of a high pulse 335H with REGION C crosses (or hits) the HIGH PEAK signal. If so, then in step 1315 HIGH PEAK HIT Counter 665 (FIG. 10) is incremented and the invention proceeds to step 1320. If the HIGH PEAK HIT (REGION C) signal does not occur, the invention proceeds from step 1311 to step 1320.

In step 1320 the invention determines if six (preferred value X=6) high pulses 335H with REGION C have propagated. If not, then the invention returns to step 1280. If so, then the invention proceeds to step 1325 to determine if the HIGH PEAK HIT (REGION C) signal occurs more than once (preferred value Y=1). If Y=1 crossing occurs, then the invention proceeds to step 1330 during which HIGH DAC counter 655 (FIG. 10) increments HIGH PEAK DAC 450 (FIG. 6) by one DAC value to move the HIGH PEAK signal upward from output waveform 335. The invention then proceeds to step 1335 during which the invention resets HIGH PULSE counter 660 and HIGH PEAK HIT Counter 665. The invention then proceeds from step 1335 to step 1280.

If in step 1325 the HIGH PEAK HIT (REGION C) signal has not occurred, the invention proceeds to step 1340 to determine if the HIGH PEAK HIT (REGION C) signal occurs less than W=1 time. If so, then in step 1345 HIGH DAC counter 655 decrements HIGH PEAK DAC 450 by one DAC value to move the HIGH PEAK signal down towards output waveform 335, and the invention then proceeds to step 1335. If in step 1340 the HIGH PEAK HIT (REGION C) does occur, the invention proceeds directly to step 1335, in which case HIGH PEAK DAC 450 is not changed.

FIG. 23 is a flowchart illustrating steps in a method for implementing peak adjustments when following low pulses 335L, i.e., setting the signal LOW PEAK, according to a preferred embodiment The steps in the flowchart of FIG. 23 correspond to the discussion of the steps in the flowchart of FIG. 22. FIG. 23 corresponds to how the invention implements peak adjustment from step 1504 through step 1512 in FIG. 14A. Peak training, mode ends when both HIGH PEAK and LOW PEAK training modes have independently ended.

Figure 24:
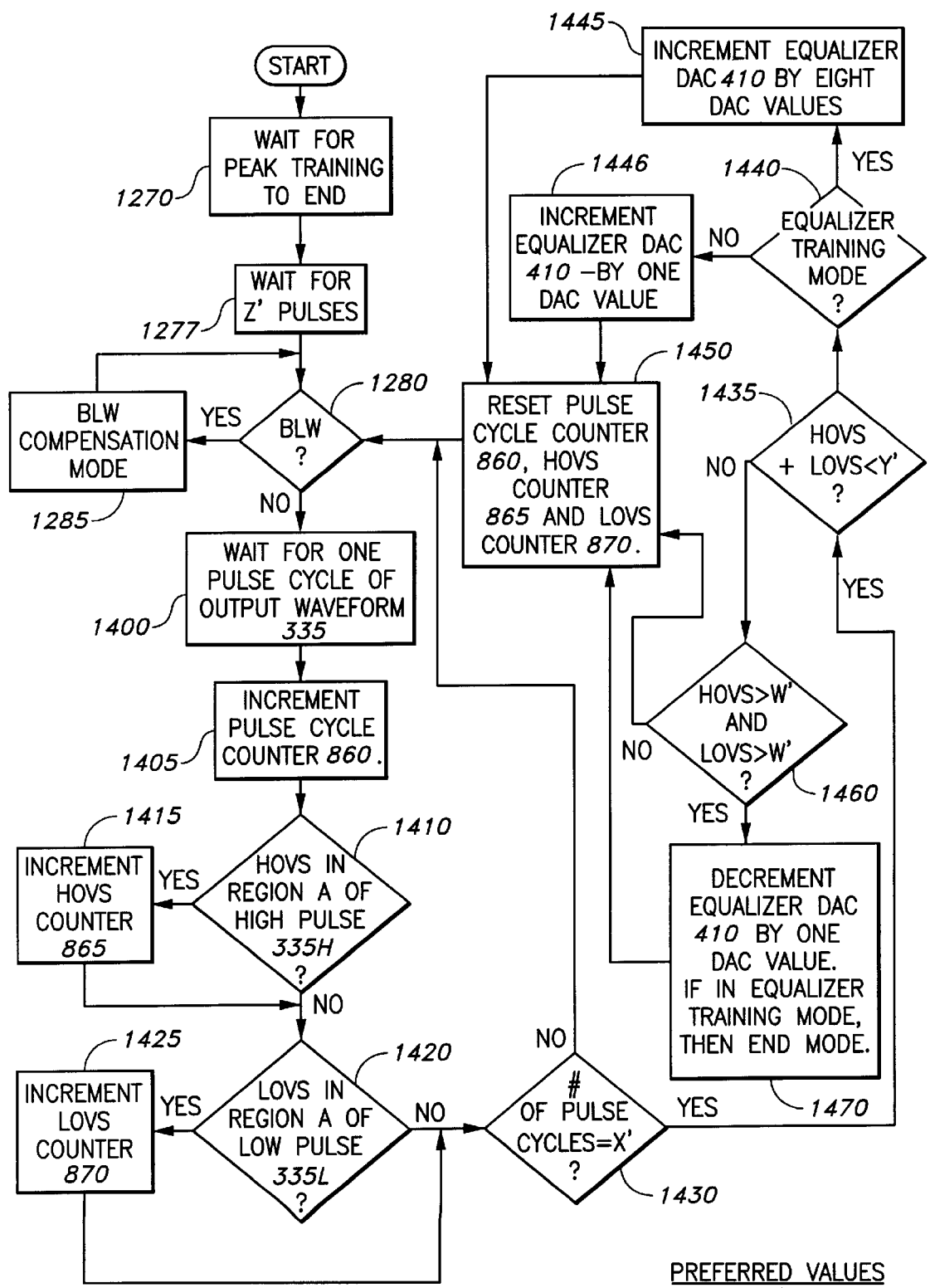
FIG. 24 is a flowchart illustrating steps in a method for implementing the adaptive equalizer training mode and for implementing equalization adjustment after training, according to a preferred embodiment.

FIG. 24 is a flowchart illustrating steps in a method for adjusting the equalization of output waveform 335, according to a preferred embodiment of the invention. FIG. 24 corresponds to how the invention implements equalization adjustment from step 1506 through 1512 in FIG. 14A. Referring to FIG. 24, in step 1270 the invention waits for peak training mode to end. The invention then waits in step 1277 for 64 pulses to pass. An occurrence of baseline wander in output waveform 335 may be detected in step 1280. If baseline wander is detected, then in step 1285 determination of equalization is suspended while the BLW algorithm operates.

The invention will wait in step 1400 for one MLT-3 pulse cycle of output waveform 335 and will increment in step 1405 pulse cycle counter 860 (FIG. 12) when one pulse cycle propagates. In step 1410 if an overshoot 1100 crosses the HIGH-PEAK(REGION A) signal, then AND gate 612 (FIG. 9) produces the HOVS signal. If so, the invention proceeds to step 1415 during which the HOVS signal increments HOVS counter 865 (FIG. 12). The invention then proceeds to step 1420. If in step 1410 an overshoot 1100 does not cross the HIGH-PEAK(REGION A) signal, then the invention proceeds directly to step 1420.

In step 1420 if an overshoot 1105 crosses the LOW-PEAK (REGION A) signal, then AND gate 616 (FIG. 9) produces the LOVS signal. The invention proceeds to step 1425 during which the LOVS signal increments LOVS Counter 870 (FIG. 12). The invention then proceeds to step 1430. If in step 1420 an overshoot 1105 does not cross the LOW-PEAK(REGION A) signal, then the invention proceeds directly to step 1430.

In step 1430 the invention determines if the number of pulse cycles which have propagated, as indicated by the pulse cycle counter 860, is equal to thirty-two (preferred value B=32). If the number is not equal to thirty-two (B=32), then the invention proceeds from step 1430 to step 1280 and then to step 1400 to test for additional pulse cycles of output waveform 335.

If in step 1430 the number of pulse cycles which have propagated is equal to thirty-two (B=32), then the invention proceeds to step 1435 during which the invention determines if the sum of the overshoot 1100/HIGH-PEAK(REGION A) signal crossings and of the overshoot 1105/LOW-PEAK (REGION A) signal crossings is less than three (programmable value C). If so, output waveform 335 is underequalized and the invention proceeds to step 1440. If the invention is in the adaptive equalizer training mode, then the invention proceeds from step 1440 to step 1445 during which equalizer DAC 905 (FIG. 12) increments by eight DAC values the equalizer DAC 410 output signal to increase equalization of output waveform 335. In step 1450 pulse cycle counter 860, HOVS counter 865 and LOVS counter 870 are reset. The invention then proceeds to step 1280.

If in step 1440 the adaptive equalizer training mode has terminated, then in step 1446 equalizer DAC counter 905 (FIG. 12) increments by one DAC value the equalizer DAC 410 output signal to add equalization gain to output waveform 335. The invention then proceeds to step 1450.

If in step 1435 the sum of the overshoot 1100/HIGH-PEAK(REGION A) signal crossings and of the overshoot 1105/LOW-PEAK(REGION A) signal crossings is not less than three, then the invention proceeds to step 1460.

In step 1460 the invention determines if the overshoot 1100/HIGH-PEAK(REGION A) signal crossing count is greater than four (programmable value A), and if the overshoot 1105/LOW-PEAK(REGION A) signal crossing count is greater than A=4. If not, then output waveform 335 may have a DC shift in common mode level 1000, and the invention proceeds to step 1450. If in step 1460 the overshoot 1100/HIGH-PEAK(REGION A) signal crossing count is greater than four (programmable value A), and if the overshoot 1105/LOW-PEAK (REGION A) signal crossing count is greater than A=4, then output waveform 335 is overequalized and the invention proceeds to step 1470.

In step 1470 if the invention is in the adaptive equalizer training mode, then this mode is terminated since output waveform 335 is overequalized. If the adaptive equalizer training mode has terminated, then equalizer DAC counter 905 (FIG. 12) decrements by one DAC value the equalizer DAC 410 output signal to reduce overequalization of output waveform 335. The invention proceeds to step 1450, whether the invention is in adaptive equalizer training mode or has terminated adaptive equalizer training mode.

While various embodiments and applications of this invention have been shown and described, it will be apparent to those skilled in the art that modifications are possible without departing from the inventive concepts described herein. For example, all indicated programmable values may be varied for particular applications of the invention. The invention, therefore, is not to be restricted except in the spirit of the appended claims.

We claim:

1. A method for adaptive equalization of a waveform, comprising the steps of:
   (1) initiating a peak training mode;
   (2) initiating an adaptive equalizer training mode at the termination of peak training mode; and
   (3) initiating an adaptive equalizer mode at the termination of said adaptive equalizer training mode; wherein said step for initiating the adaptive equalizer mode comprises the steps of:
     (a) computing a moving-average of peak voltage levels of low-pass filtered high pulses;
     (b) measuring the peak voltage level of a high pulse;
     (c) subtracting the result of step (a) from the result of step (b);
     (d) using the result of step (b) to compute an updated moving-average of the peak voltage levels of the low-pass filtered high pulses;
     (e) computing a moving-average of peak voltage levels of low-pass filtered low pulses;
     (f) measuring the peak voltage level of a low pulse;
     (g) subtracting the result of step (e) from the result of step (f);
     (h) using the result of step (f) to compute an updated moving-average of the peak voltage levels of the low-pass filtered low pulses; and
     (i) using the subtraction results of step (g) and step (c) to provide the required equalization of the waveform.

2. A method for adaptive equalization of a waveform, comprising the steps of:
   (1) initiating a peak training mode;
   (2) initiating an adaptive equalizer training mode at the termination of said peak training mode; and (3) initiating an adaptive equalizer mode at the termination of said adaptive equalizer training mode;

wherein said step for initiating adapative equalizer mode is a method comprising the steps of:
  (a) computing a moving-average of peak voltage levels of filtered high pulses;
  (b) measuring the peak voltage level of a high pulse;
  (c) subtracting the result of step (a) from the result of step (b);
  (d) using the result of step (b) to compute an updated moving-average of the peak voltage levels of the low-pass filtered high pulses; and
  (e) using the subtraction results of step (c) to provide the required equalization of the waveform.

3. A method for adaptive equalization of a waveform, comprising the steps of:
  (1) initiating a peak training mode;
  (2) initiating an adaptive equalizer training mode at the termination of peak training mode; and
  (3) initiating an adaptive equalizer mode at the termination of said adaptive equalizer training mode;

wherein said step for initiating adaptive equalizer mode is a method comprising the steps of:
    (a) computing a moving-average of peak voltage levels of low-pass filtered low pulses;
    (b) measuring the peak voltage level of a low pulse;
    (c) subtracting the result of step (a) from the result of step (b);
    (d) using the result of step (b) to compute an updated moving-average of the peak voltage levels of the low-pass filtered low pulses; and
    (e) using the subtraction results of step (c) to provide the required equalization of the waveform.

4. A system for adaptive equalization of a waveform, comprising an execution system for executing a peak training mode, an adaptive equalizer training mode, and an adaptive equalizer mode, wherein said execution system comprises a receiver for the waveform, an equalizer, a waveform analyzer stage, a digital logic control stage, a management port, a delay line calibration circuit, an equalizer digital-to-analog converter, and a baseline wander digital-to-analog converter.

5. The circuit of claim 4, wherein said delay line calibration circuit comprises means for automatically calibrating said digital logic control stage for process variations in temperature and voltage.

6. The circuit of claim 4, wherein said waveform analyzer stage comprises a means for receiving commands from said digital logic control stage, a receiving means for a waveform, a means for computing a proper peak voltage for the high and low pulses of a received waveform, and means for sending signals back to said digital logic control stage.

7. The circuit of claim 6, wherein said means for computing the proper peak voltage for the high and low pulses of a received waveform comprises a compound comparator means for splitting a high frequency voltage region and low frequency voltage region from a received pulse and comparing said regions to a reference voltage.

8. The circuit of claim 4, wherein said digital logic control stage comprises means for commanding and controlling said peak training mode, said adaptive equalizer training mode, and said adaptive equalizer mode.

9. The circuit of claim 8, wherein said digital logic control stage further comprises means for sending commands to said waveform analyzer stage, means for receiving signals from said waveform analyzer stage, and means for commanding said equalizer.

10. The circuit of claim 4, wherein said management port comprises means for sending predetermined control parameters to said digital logic control stage and to said waveform analyzer stage.

* * * * *